US012160863B2

(12) United States Patent
Wang et al.

(10) Patent No.: US 12,160,863 B2
(45) Date of Patent: Dec. 3, 2024

(54) NETWORK-CONTROLLED SIDELINK SCHEDULING TECHNIQUES

(71) Applicant: QUALCOMM Incorporated, San Diego, CA (US)

(72) Inventors: Xiaojie Wang, Hillsborough, NJ (US); Piyush Gupta, Bridgewater, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/586,588

(22) Filed: Jan. 27, 2022

(65) Prior Publication Data

US 2023/0269735 A1     Aug. 24, 2023

(51) Int. Cl.
*H04W 72/20*     (2023.01)
(52) U.S. Cl.
CPC .................. *H04W 72/20* (2023.01)
(58) Field of Classification Search
CPC .... H04L 1/1864; H04W 72/20; H04W 72/40; H04W 72/232; H04W 76/14; H04W 92/18
See application file for complete search history.

(56) References Cited

U.S. PATENT DOCUMENTS

| | | | | |
|---|---|---|---|---|
| 2020/0022089 A1* | 1/2020 | Guo | ....................... | H04L 1/1812 |
| 2020/0367095 A1* | 11/2020 | Pan | ....................... | H04L 1/1874 |
| 2021/0028891 A1* | 1/2021 | Zhou | ....................... | H04W 4/40 |
| 2021/0266110 A1* | 8/2021 | Wang | ................ | H04W 72/0446 |
| 2021/0377919 A1 | 12/2021 | Fong et al. | | |
| 2021/0410178 A1 | 12/2021 | Wang et al. | | |
| 2022/0216975 A1* | 7/2022 | Hwang | ................. | H04L 1/1861 |

FOREIGN PATENT DOCUMENTS

| | | | | |
|---|---|---|---|---|
| EP | 4072195 A1 | 10/2022 | | |
| WO | WO-2021028389 A1 * | 2/2021 | .......... | H04B 7/0478 |
| WO | WO-2021112610 A1 | 6/2021 | | |
| WO | WO-2022195713 A1 * | 9/2022 | | |

OTHER PUBLICATIONS

International Search Report and Written Opinion—PCT/US2023/010390—ISA/EPO—Apr. 21, 2023.

\* cited by examiner

*Primary Examiner* — Khoa Huynh
(74) *Attorney, Agent, or Firm* — Kevin M. Donnelly; Holland & Hart LLP

(57) ABSTRACT

Methods, systems, and devices for a wireless communication are described. A base station may control multiple parameters for sidelink communication configurations to be used by a user equipment (UE) for sidelink communications. The base station may determine the multiple parameters for sidelink communication configurations and configure multiple UEs for sidelink communication based on the determination. The multiple parameters may include a modulation and coding scheme, a redundancy version, a demodulation reference signal pattern or port, a transmit power control, a sidelink hybrid automatic repeat request (HARQ) indicator, a cast type, a HARQ process number, a receiver UE identifier, or any combination thereof. The indication may be included in downlink control information.

29 Claims, 15 Drawing Sheets

NETWORK-CONTROLLED SIDELINK SCHEDULING TECHNIQUES

TECHNICAL FIELD

The following relates to a wireless communication, including network-controlled sidelink scheduling techniques.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include multiple base stations or multiple network access nodes, each simultaneously supporting communication for multiple communication devices, which may be otherwise known as user equipment (UE). Some of the communication devices may control parameters for sidelink communication configurations associated with sidelink communications between the communication devices. In some cases, however, by giving control to these communication devices, the multiple base stations or the multiple network access nodes may not be informed about, and may not be able to control, the sidelink communication configurations associated with the sidelink communications. As a result, the wireless multiple-access communications system may not effectively nor efficiently configure the sidelink communication configurations associated with sidelink communications between the communication devices.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a first user equipment (UE). The method may include receiving, from a base station, an indication of a set of parameters for a sidelink communication configuration associated with sidelink communications over a sidelink, setting one or more parameters for the sidelink communications over the sidelink based on receiving the indication of the set of parameters for the sidelink communication configuration from the base station, and communicating, over the sidelink, with a second UE based on setting the one or more parameters for the sidelink communications over the sidelink.

Another innovative aspect of the subject matter described in this disclosure can be implemented in an apparatus for wireless communication at a first UE. The apparatus may include a processor, memory coupled with the processor, and instructions stored in the memory. The instructions may be executable by the processor to cause the apparatus to receive, from a base station, an indication of a set of parameters for a sidelink communication configuration associated with sidelink communications over a sidelink, set one or more parameters for the sidelink communications over the sidelink based on receiving the indication of the set of parameters for the sidelink communication configuration from the base station, and communicate, over the sidelink, with a second UE based on setting the one or more parameters for the sidelink communications over the sidelink.

Another innovative aspect of the subject matter described in this disclosure can be implemented in an apparatus for wireless communication at a first UE. The apparatus may include means for receiving, from a base station, an indication of a set of parameters for a sidelink communication configuration associated with sidelink communications over a sidelink, means for setting one or more parameters for the sidelink communications over the sidelink based on receiving the indication of the set of parameters for the sidelink communication configuration from the base station, and means for communicating, over the sidelink, with a second UE based on setting the one or more parameters for the sidelink communications over the sidelink.

Another innovative aspect of the subject matter described in this disclosure can be implemented in a non-transitory computer-readable medium storing code for wireless communication at a first UE. The code may include instructions executable by a processor to receive, from a base station, an indication of a set of parameters for a sidelink communication configuration associated with sidelink communications over a sidelink, set one or more parameters for the sidelink communications over the sidelink based on receiving the indication of the set of parameters for the sidelink communication configuration from the base station, and communicate, over the sidelink, with a second UE based on setting the one or more parameters for the sidelink communications over the sidelink.

One innovative aspect of the subject matter described in this disclosure can be implemented in a method for wireless communication at a base station is described. The method may include transmitting, to a first UE, an indication of a set of parameters for a sidelink communication configuration associated with sidelink communications between the first UE and a second UE over a sidelink and communicating with the first UE based on transmitting the indication of the set of parameters for the sidelink communication configuration.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to transmit, to a first UE, an indication of a set of parameters for a sidelink communication configuration associated with sidelink communications between the first UE and a second UE over a sidelink and communicate with the first UE based on transmitting the indication of the set of parameters for the sidelink communication configuration.

Another innovative aspect of the subject matter described in this disclosure can be implemented in an apparatus for wireless communication at a base station. The apparatus may include means for transmitting, to a first UE, an indication of a set of parameters for a sidelink communication configuration associated with sidelink communications between the first UE and a second UE over a sidelink and means for communicating with the first UE based on transmitting the indication of the set of parameters for the sidelink communication configuration.

Another innovative aspect of the subject matter described in this disclosure can be implemented in a non-transitory computer-readable medium storing code for wireless communication at a base station is described. The code may include instructions executable by a processor to transmit, to a first UE, an indication of a set of parameters for a sidelink communication configuration associated with sidelink communications between the first UE and a second UE over a sidelink and communicate with the first UE based on transmitting the indication of the set of parameters for the sidelink communication configuration.

DETAILED DESCRIPTION

Figure 1:
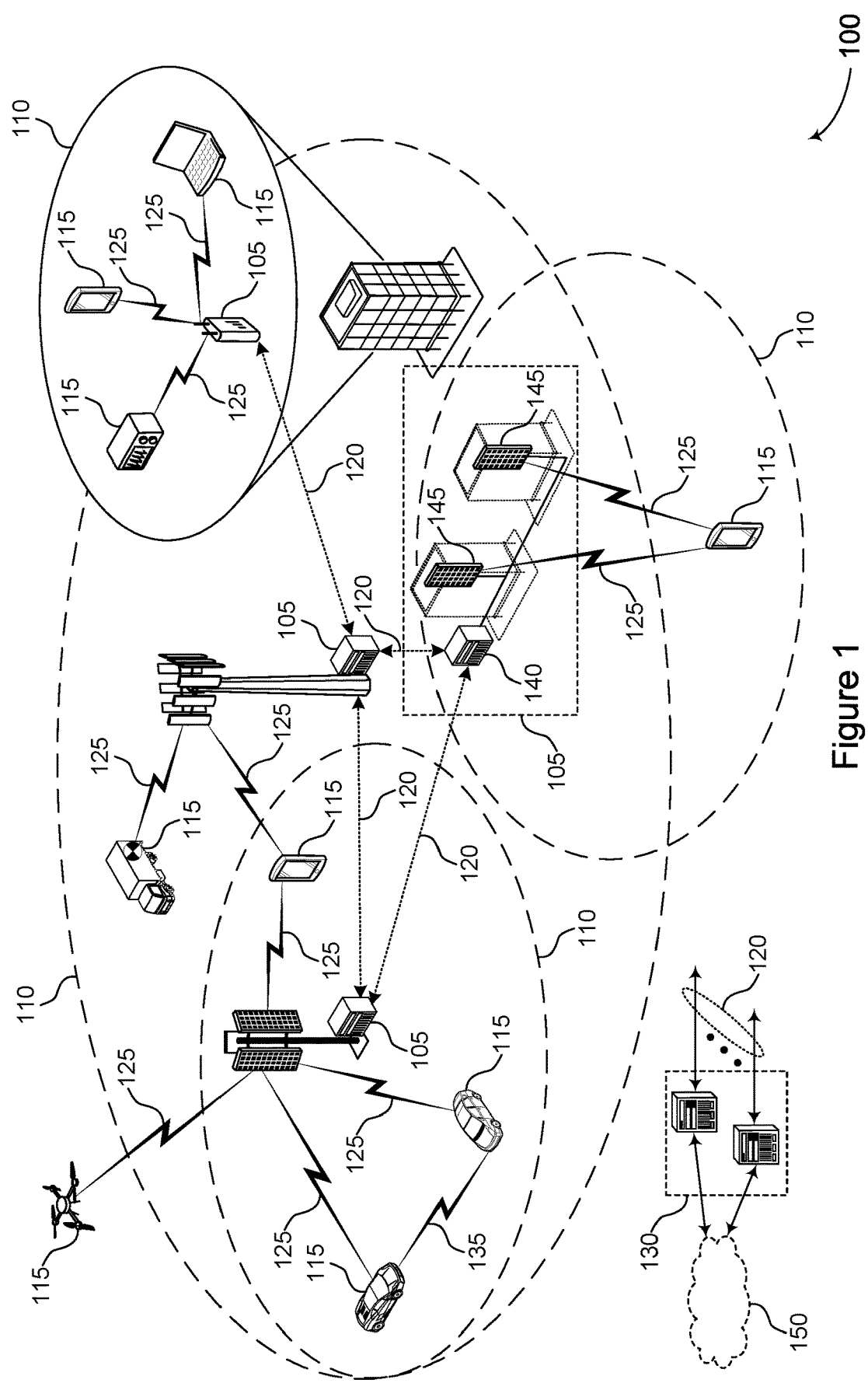
FIGS. 1 and 2 illustrate examples of wireless communications systems that support network-controlled sidelink scheduling techniques in accordance with aspects of the present disclosure.

Wireless communications systems may support sidelink communications in which a user equipment (UE) may control multiple parameters for sidelink communication configurations associated with the sidelink communications, rather than relying on a base station. For example, the UE may determine the multiple parameters for sidelink communication configurations to communicate with other UEs. In some cases, the UE may determine the parameters based on little or no indication from the base station and the base station may have limited control or knowledge of the multiple parameters. However, the UE may not sufficiently determine or address potential issues that may arise based on the sidelink communication configurations. On the other hand, the base station may have access to more information about the wireless communications system than the UE, and may be better equipped to determine at least some of the multiple parameters. But by relying on the UE to determine the multiple parameters for sidelink communication configurations, with little or no indication from the base station, the base station may not be informed about, and may not be able to control, the sidelink communication configurations used or to be used. As a result, the wireless communications system (including the other UEs configured for sidelink communications) may experience drawbacks that could otherwise be avoided (for example, interference and inefficient use of network resources).

Various aspects generally relate to sidelink communications, and more specifically, to techniques that enable a base station to have control over (for example, have stricter control compared to existing techniques) multiple parameters for sidelink communication configuration to be used by a UE for the sidelink communications. The techniques enable the base station to select the multiple parameters for one or more sidelink communication configurations and to configure multiple UEs for the sidelink communications based on the selected parameters. For example, the base station may select a sidelink communication parameter for a sidelink configuration based on information about a wireless communications system, and may then transmit an indication of the sidelink communication parameter to the UE. The UE may set one or more sidelink communication parameters, including the indicated sidelink communication parameter, and communicate with another UE based on setting the one or more sidelink communication parameters. In some examples, the one or more sidelink communication parameters may include: a sidelink feedback procedure enable, a modulation and coding scheme (MCS), a redundancy version (RV), a demodulation reference signal (DMRS) pattern or port, a transmit power control (TPC), a sidelink hybrid automatic repeat request (HARQ) indicator, a sidelink channel state information reference signal (CSI-RS) transmission mode, a precoder, a codebook-based sidelink communication enable, reference signal ports for the sidelink communication, one or more beta offsets, a cast type, a HARQ process number (HPN), a receiver UE identifier, other information, or any combination thereof. In some examples, the selected sidelink communication parameter may be indicated in downlink control information (DCI), a radio resource control (RRC) message, a medium access control-control element (MAC-CE), or any combination thereof.

Particular aspects of the subject matter described herein may be implemented to realize one or more of the following potential advantages. The techniques employed by the described communication devices may result in a relatively more efficient and flexible wireless communications system. For example, operations performed by the base station may increase efficiency by controlling the multiple parameters for sidelink communication configurations. In some implementations, allowing control of the multiple parameters by the base station may limit issues with hidden network nodes because the base station will be more likely to be able to discover and compensate for the hidden network nodes than a UE or other device. In some implementations, operations performed by the described communication devices (for example, base stations or UEs) may also support improvements to sidelink interference management, multiple-user multiple-input multiple-output (MU-MIMO) management, power management, and spatial efficiency, among other benefits by controlling the multiple parameters for sidelink communication configurations.

Aspects of the disclosure are initially described in the context of wireless communications systems. Aspects of the disclosure are then described in the context of system diagrams and a process flow. Aspects of the disclosure are further illustrated by and described with reference to apparatus diagrams, system diagrams, and flowcharts that relate to network-controlled sidelink scheduling techniques.

FIG. 1 illustrates an example of a wireless communications system 100 that supports network-controlled sidelink scheduling techniques in accordance with aspects of the present disclosure. The wireless communications system 100 may include multiple base stations 105, multiple UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via multiple communication links 125. Each base station 105 may provide a coverage area 110 over which the UEs 115 and the base station 105 may establish multiple communication links 125. The coverage area 110 may be an example of a geographic area over which a base station 105 and a UE 115 may support the communication of signals according to multiple radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

In some examples, multiple components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through multiple backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include multiple wireless links.

Multiple of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via multiple communication links 125 over multiple carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to multiple physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and multiple uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

Multiple numerologies for a carrier may be supported, in which a numerology may include a subcarrier spacing ($\Delta f$) and a cyclic prefix. A carrier may be divided into multiple BWPs having the same or different numerologies. In some examples, a UE 115 may be configured with multiple BWPs. In some examples, a single BWP for a carrier may be active at a given time and communications for the UE 115 may be restricted to multiple active BWPs.

The time intervals for the base stations 105 or the UEs 115 may be expressed in multiples of a basic time unit, which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing multiple symbols. Excluding the cyclic prefix, each symbol period may contain multiple (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using multiple of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a portion of the system bandwidth of the carrier. Multiple control regions (for example, CORESETs) may be configured for a set of the UEs 115. For example, multiple of the UEs 115 may monitor or search control regions for control information according to multiple search space sets, and each search space set may include one or multiple control channel candidates in multiple aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via multiple cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a portion of structure) to larger areas depending on various factors such as the capabilities of the base station 105. For example, a cell may be or include a building, a portion of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the multiple cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by multiple services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). Multiple UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via multiple network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for multiple network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through multiple other access network transmission entities 145, which may be referred to as radio heads, smart radio heads, or transmission/reception points (TRPs). Each access network transmission entity 145 may include multiple antenna panels. In some configurations, various functions of each access network entity 140 or base station 105 may be distributed across various network devices (for example, radio heads and ANCs) or consolidated into a single network device (for example, a base station 105).

The wireless communications system 100 may operate using multiple frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use multiple different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within multiple antenna arrays or antenna panels, which may support MIMO operations or transmit or receive beamforming. For example, multiple base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have multiple antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and MU-MIMO, in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in multiple beam directions. For example, a UE 115 may receive multiple of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for multiple beam directions, and the feedback may correspond to a configured number of beams across a system bandwidth or multiple sub-bands. The base station 105 may transmit a reference signal (for example, a cell-specific reference signal (CRS), a CSI-RS), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in multiple directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In some examples, sidelink communications may operate according to different modes. For example, the sidelink communications may operate according to a sidelink Mode 1 or a sidelink Mode 2. The sidelink Mode 1 transmission may indicate that the base stations 105 may reserve time and frequency resources for the UEs 115 to use for sidelink communications, among other procedures. The sidelink Mode 2 may indicate that the UEs 115 may reserve time and frequency resources for sidelink communications, among other rules. According to the sidelink Mode 1 procedure, the base station 105 may transmit a control message (for example, RRC or DCI) to a first UE 115 for sidelink communications between the first UE 115 and a second UE 115. In some cases, the control message (for example, a DCI 3_0 format message) may include: a resource pool (RP) index (for example, bits depending on a number of RPs in sl-TxPoolScheduling); a time gap (for example, three bits by sl-DCI-ToSL-Trans); an HPN (for example, four bits); a new data indicator (NDI) (for example, one bit); a subcarrier index (for example, a minimum subcarrier index); sidelink control information (SCI) format fields, including time domain resource allocation (TDRA), frequency domain resource allocation (FDRA), or both; a physical sidelink feedback channel (PSFCH) to HARQ feedback timing (for example, by sl-PSFCH-ToPUCCH); a physical uplink control channel (PUCCH) resource indicator (for example, three bits); a configuration index (zero bits in examples in which only dynamic grant based monitoring, three bits otherwise); a sidelink assignment indicator (SAI) (two bits); and padding bits.

In some cases, the sidelink Mode 1 transmission may indicate a level of control for the base station 105 and a level of freedom for the UE 115. For example, the base station 105 may control resource allocation for sidelink communications (transport blocks (TBs)) and retransmissions of the sidelink communications. The UE 115 may decide which sidelink communication of the sidelink communications (including the destination or receiver identifier (ID)) to transmit or retransmit using the allocated resources. Additionally, the base station 105 may use the NDI to force the UE 115 to drop a retransmission of the sidelink communications, such that the base station 105 may control a maximum number of retransmissions.

The base station 105 operating in the sidelink Mode 1 may configure a range (for example, a lower end value and an upper end value) of an MCS via a control message (for example, RRC signaling). The UE 115 may select the MCS within the range configured by the base station 105. In some cases, the level of freedom for the UE 115 may allow the UE 115 to enable or disable sidelink feedback (for example, HARQ) and determine an HPN to use over the sidelink communications. The UE 115 may determine a DMRS pattern or port, MIMO layers, precoding, CSI-RS, an RV ID, a cast type (for example, broadcast, unicast, and group-cast), among others. However, these levels of control for the UE 115 may cause inefficiencies within the wireless communications system 100.

In some cases, the level of control for the base station 105 may also lack interference management. For example, because the UE 115 may decide the destination of the sidelink communication, the base station 105 may not be informed about a device to which the allocated resources are being transmitted, and may lack information to effectively manage sidelink interference. Additionally, the UE 115 may not use the allocated resources for the sidelink communications and may be forced to follow the NDI in the DCI, which may cause negative acknowledgment to acknowledgment (NAK-to-ACK) PUCCH errors, among other issues.

In general, the wireless communications systems 100 may support sidelink communications in which UEs 115 may control multiple parameters for sidelink communication configurations. Rather than relying on a network node, such as a base station 105, in some cases some other different wireless communications systems (for example, operating according to sidelink Mode 1) may support a UE 115 that determines the multiple parameters for sidelink communication configurations to communicate with other UEs 115. In some cases, the UE 115 may determine the multiple parameters based on little or no indication from the base station 105. For example, a transmitter UE 115 may set a parameter for a sidelink communication configuration and communicate with multiple receiver UEs 115 based on the sidelink transmission configuration.

In some cases, the base station 105 may have limited control or knowledge of the multiple parameters. The base station 105 may transmit an indication for the multiple parameters to the UE 115 in a DCI message (for example, DCI 3_0) and the UE 115 may set parameters of the multiple parameters for the sidelink communication configuration based on the indication. However, by generally relying on the UE 115 to determine the multiple parameters for sidelink communication configurations, with little or no indication from the base station 105, the base station 105 may not be informed about and may not be able to control the sidelink transmission configurations used, and the UE 115 may not sufficiently determine potential issues that can arise based on the sidelink transmission configuration. Because the base station 105 may not be informed, the wireless communications system 100 (including the UE 115 and the other UEs 115 that may be configured for the sidelink transmissions between) may experience drawbacks that could otherwise be avoided (for example, interference and inefficient use of network resources). It may be beneficial to have more control at the bast station 105 and more reporting by the UE 115 to the base station 105.

The techniques described herein provide techniques and procedures for a base station 105 to control (for example, have stricter control compared to other different wireless communications systems) multiple parameters for sidelink communication configurations to be used by UEs 115 for sidelink communications. The techniques enable the base station 105 to determine the multiple parameters for sidelink communication configurations (for example, sidelink transmissions and parameters may be fully under the control of the base station 105) and to configure multiple UEs 115 for sidelink communication based on the determination. For example, the base station 105 may determine one or more sidelink communication parameters for a sidelink configuration based on information (for example, load of a cell) about a wireless communications system and transmit an indication that includes the one or more sidelink communication parameters to at least a first UE 115. The first UE 115 may set (for example, configuring an initial value or updating an existing value) the sidelink communication parameter and communicate with a second UE 115 based on setting the sidelink communication parameter. In some examples, the sidelink communication parameter may include an MCS, an RV, a DMRS pattern or port, a TPC, a sidelink HARQ indicator (enable/disable), a cast type, an HPN, a receiver UE identifier, or any combination thereof. In some cases, the indication may be included in a DCI message.

By giving control of setting the one or more sidelink communication parameters to the base station 105 in some examples, power and spatial resource management may be increased. For example, the base station 105 may determine the transmit power of the UE 115 (for example, because the base station 105 indicated what transmit power to use). Because the base station 105 determines the transmit power of the UE 115 for the sidelink communication, the base station 105 may increase spatial resource (for example, time and frequency resources) reuse (for example, in frequency range 1 or licensed band) with the multiple UEs 115 in wireless communication with the base station 105. Additionally, or alternatively, a gain of one or more transmissions may increase because the base station 105 determines a beam direction from the first UE 115 to the second UE 115 of the sidelink communication.

Figure 2:
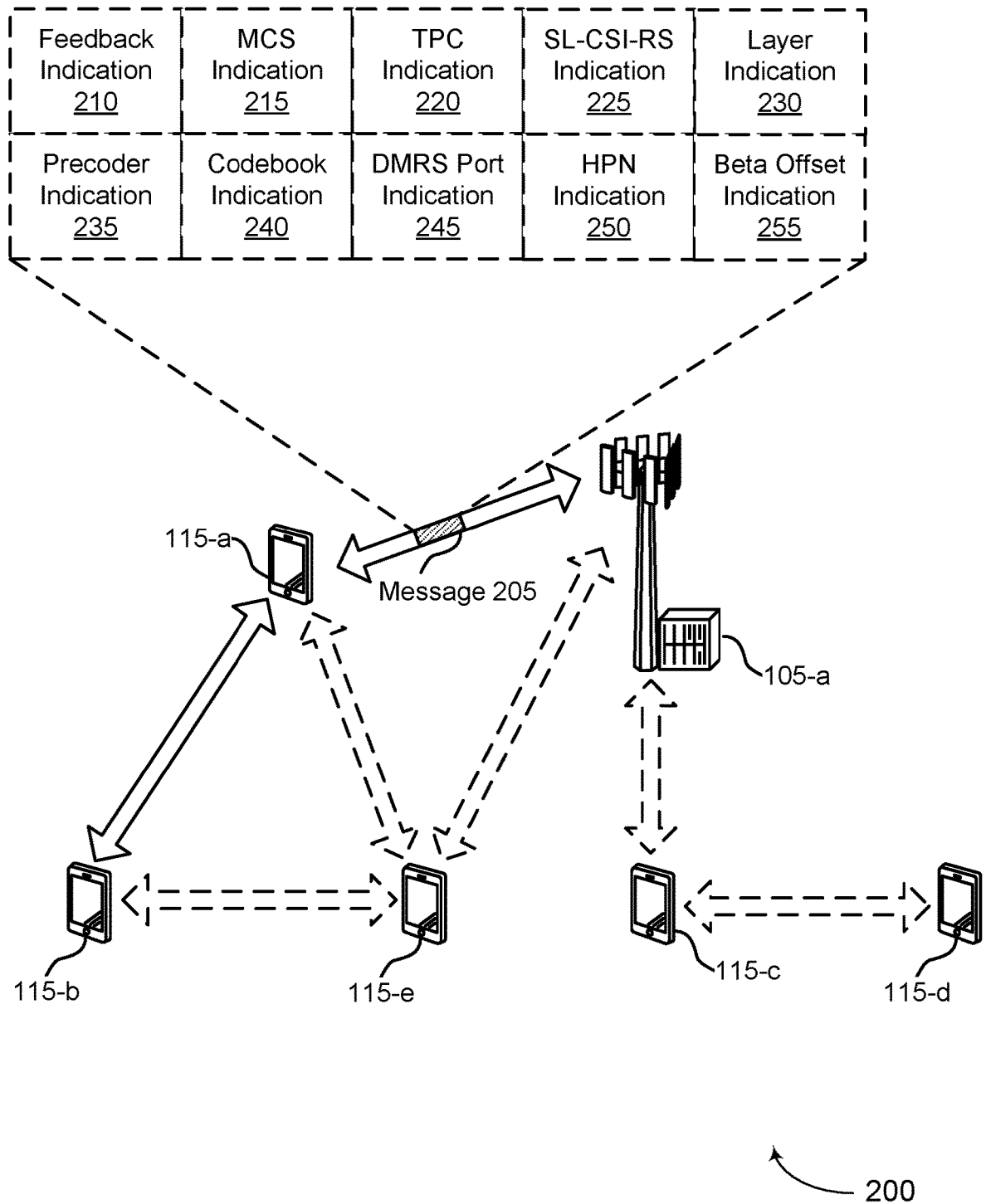

FIG. 2 illustrates an example of a wireless communications system 200 that supports network-controlled sidelink scheduling techniques in accordance with aspects of the present disclosure. In some examples, the wireless communications system 200 may implement or be implemented by aspects of the wireless communications system 100. The wireless communications system 200 may include a base station 105-a, a UE 115-a, a UE 115-b, a UE 115-c, a UE 115-d, and a UE 115-e, which may be an example of a base station 105 and a UE 115, as described with reference to FIG. 1. In some implementations, the UE 115-a may represent a transmitter UE 115 and the UE 115-b may represent a receiver UE 115, as described with reference to FIG. 1.

One or both of the base station 105-a or the UE 115-b may be in wireless communication with the UE 115-a. The base station 105-a, the UE 115-a, and the UE 115-b may support sidelink communication (for example, according to a sidelink Mode 1) with a level of UE freedom to select or determine parameters for the sidelink communication. However, the level of UE freedom may be based on limited information and capabilities and, as such, the sidelink communication may be inefficient. This may result in interference and inefficient use of network resources, among others. To avoid such issues, in accordance with examples of the present disclosure, the base station 105-a may support transmitting sidelink scheduling control information for sidelink communication between the UE 115-a and the UE 115-b. For example, the base station 105-a may transmit a message 205, to the UE 115-a, including an indication of a set of parameters to configure the UE 115-a for the sidelink communication with the UE 115-b. In some examples, the message 205 may be a DCI message, a MAC-CE message, or an RRC message.

In some implementations, the base station 105-a may have more information about the wireless communications system 200 than the UE 115-a and be more capable to schedule or configure the UE 115-a. For example, the base station 105-a may also be in wireless communication with the UE 115-c, and the UE 115-c in wireless communication with the UE 115-d. Because the base station 105-a is in wireless communication with both the UE 115-a and the UE 115-c, the base station 105-a may reuse sidelink resources scheduled for the UE 115-a for the UE 115-c. The base station 105-a may transmit the message 205 to the UE 115-c for a sidelink communication between the UE 115-c and the UE 115-d, based on information (for example, transmission power) collected from the UE 115-a.

In some examples, the base station 105-a, the UE 115-b, and the UE 115-e may be in wireless communication with the UE 115-a. The wireless communication (sidelink communication) between the UE 115-b and the UE 115-a may include a first MIMO layer (for example, layer one), and the wireless communication (sidelink communication) between the UE 115-e and the UE 115-a may include a second MIMO layer (for example, layer two). The base station 105-a may transmit the message 205 to the UE 115-a. The message 205 may include an indication of a precoder parameter for the first MIMO layer such that interference with the second MIMO layer is reduced. In this way, the UE 115-a may reuse a same sidelink resource for both the first MIMO layer and the second MIMO layer. These examples are meant to be illustrative of the possible benefits of the base station 105-a controlling parameters for the sidelink communication configurations, and are not to be construed as limited to only these specific implementations. Many more benefits and configurations of wireless communication between the base station 105-a and the UE 115-a, the UE 115-b, the UE 115-c, the UE 115-d, and the UE 115-e are contemplated.

In some examples, the message 205 may include a feedback indication 210. The base station 105-a may use the feedback indication 210 to indicate whether a sidelink feedback procedure (for example, a sidelink HARQ) is enabled or disabled. The feedback indication 210 may be an implicit indication or an explicit indication.

For example, the base station 105-a may reuse a PUCCH resource indicator (PRI) included in the message 205 as the implicit indication. Whether the PRI indicates that the PUCCH is present in the message 205 may indicate whether the sidelink feedback procedure is enabled. In some implementations, the PRI indicating an absence of the PUCCH may indicate that the sidelink feedback procedure is disabled and the PRI indicating a presence of the PUCCH may indicate that the sidelink feedback procedure is enabled.

In some implementations, the feedback indication 210 may be or include a virtual RP index as the implicit indication. The base station 105-a may use the virtual RP index to indicate whether the sidelink feedback procedure is enabled. In some examples, the virtual RP index may include multiple RP indices corresponding to a single physical RP. For examples, a first RP index of the RP indices associated with enabling the sidelink feedback procedure, and a second RP index of the multiple RP indices associated with disabling the sidelink feedback procedure.

In some implementations, the feedback indication 210 may be or include a bit (for example, a bit field or a codepoint) to indicate whether the sidelink feedback procedure is enabled as the explicit indication. In examples in which the bit indicates disabled, the UE 115-a may assemble MAC protocol data units (PDU) and logical channels associated with the disabled sidelink procedure. The UE 115-a may multiplex the logical channels into the sidelink communication (for example, a TB) scheduled by the message 205. In examples in which the bit indicates enabled, the UE 115-a may assemble MAC PDU and multiplexing logical channels associated with the enabled sidelink feedback procedure, the disabled sidelink feedback procedure, or both. The UE 115-a may multiplex the logical channels into the sidelink communication (for example, the TB) scheduled by the message 205.

In some implementations, the feedback indication 210 may be or include a CRC scrambling sequence as the implicit indication. For example, the message 205 may include a CRC check that has scrambled bits (for example, sixteen scrambled bits of twenty-four total bits) scrambled by a specific sequence. The CRC scrambling sequence may include a first scrambling sequence that may be used to derive that the sidelink feedback procedure is enabled. The CRC scrambling sequence may also include a second scrambling sequence that may be used to derive that the sidelink feedback procedure is disabled.

In some implementations, the feedback indication 210 may be or include a resource pattern as the implicit indication. For example, the message 205 may include a CCE index (for example, a CCE index receiving a physical downlink control channel (PDCCH)) according to the resource pattern. The CCE index may indicate whether the sidelink feedback procedure is enabled.

In some examples, the UE 115-a may report a preference or request of whether the sidelink feedback procedure is enabled for each logical channel of a group of logical channels. The report may include an implicit indication or an explicit indication.

For example, the indication (for example, the implicit indication) may be configured (for example, preconfigured or through a coordinated configuration procedure) such that the base station 105-a and the UE 115-a may agree on a mapping between each logical channel (for example, based on a logical channel ID) and whether that logical channel is associated with an enabled sidelink feedback procedure. In some examples, the report may be a MAC-CE or an RRC for each logical channel ID, or a buffer status report (BSR) MAC-CE for each TB, such that the UE 115-a may transmit the report to the base station 105-a with the indication (for example, the explicit indication). The base station 105-a may transmit the message 205 based on the report.

In some examples, the message 205 may include an MCS indication 215. The base station 105-a may use the MCS indication 215 to indicate to the UE 115-a a value for an MCS parameter. The MCS parameter may be controlled by the base station 105-a implicitly or explicitly. For example, the MCS indication 215 may include an MCS bit field in the message 205. The MCS bit field may explicitly indicate to the UE 115-a the value for the MCS parameter. In some implementations, the MCS indication 215 may be an implicit indication based on a TB size, number of resource elements, or both. For example, the base station 105-a may determine a TB threshold size and transmit the TB threshold size to the UE 115-a. The TB threshold size may indicate to the UE 115-a the MCS parameter. In some examples, the UE 115-a may determine to report a BSR based on the TB size being less than the TB threshold size. In some examples, the UE 115-a may report multiple BSRs based on the TB size being larger than the TB threshold size. The MCS parameter value may change (for example, increase or decrease) based on the TB size in relation to the TB threshold size.

In some examples, the message 205 may include a TPC indication 220 (for sidelink interference management). The base station 105-a may use the TPC indication 220 to indicate to the UE 115-a a value for a physical sidelink shared channel (PSSCH) transmit power (for example, a TPC parameter) based on sidelink power characteristics. For example, the sidelink power characteristics may include a sidelink power report, whether a power control is open-loop, or closed-loop, or both. In some implementations, the UE 115-a may transmit to the base station 105-a the sidelink power report (for example a reference signal received report (RSRP) or a power headroom report (PHR)). The TPC indication 220 may indicate to change the transmit power (for example, increase by a quantity of dBs or decrease by a quantity of dBs) based on the sidelink power report and the power control associated with closed-loop. The TPC indication 220 may indicate setting the TPC parameter (a power determination parameter) to the indicated value (for example, alpha, nominal transmission power, among others) based on the sidelink power report and the power control associated with open-loop.

In some implementations, the base station 105-a may use the TPC indication 220 to indicate to the UE 115-a a value for a PUCCH transmit power. In some examples, the UE 115-a (for example, the transmitter UE 115) may transmit the PUCCH to the base station 105-a to indicate whether the sidelink communication was successfully decoded at the UE 115-b (for example, the receiver UE 115). The TPC indication 220 may be associated with the sidelink feedback procedure in which the TPC indication 220 may indicate the PUCCH transmit power based on whether the PUCCH is present (for example, whether the base station 105-a transmitted a PUCCH resource indicator to the UE 115-a). For example, the TPC indication 220 may indicate the PUCCH transmit power in circumstances in which the PUCCH is present and the TPC indication 220 may be used for PSSCH power control in circumstances in which the PUCCH is absent.

In some examples, the message 205 may include a sidelink CSI-RS indication 225. The base station 105-a may use the sidelink CSI-RS indication 225 to indicate to the UE 115-a one or more sidelink CSI-RS parameters. In some examples, the sidelink CSI-RS indication 225 may indicate how to transmit a sidelink CSI-RS (for example, aperiodically, semi-persistently, or periodically). For example, the sidelink CSI-RS indication 225 may trigger the UE 115-a to transmit the sidelink CSI-RS aperiodically or the UE 115-a may be preconfigured to transmit the sidelink CSI-RS semi-persistently or periodically. The message 205 (for example, a MAC-CE message or an RRC message) may trigger whether the UE 115-a is to transmit the sidelink CSI-RS, for example, semi-persistently or periodically. Additionally, or alternatively, the base station 105-a may specify, via the sidelink CSI-RS indication 225, a number of layers, beam management (beam direction), CSI, and panel or antenna switching for the sidelink communication, other information, or any combination thereof.

In some examples, the message 205 may include a layer indication 230. The base station 105-a may use the layer indication 230 to indicate to the UE 115-a a value for a layer parameter. For example, the layer indication 230 may indicate to the UE 115-a a number of layers (for example, one layer, two layers) to be used for the sidelink communication.

In some examples, the message 205 may include a codebook indication 240. The codebook indication 240 may indicate to the UE 115-a a value for a codebook parameter. For example, the codebook indication 240 may indicate whether the sidelink communication is a codebook-based sidelink communication (for example, utilizing a transmit precoding matrix index (TPMI)) or a non-codebook-based sidelink communication.

In some examples, the message 205 may include a precoder indication 235. For the codebook-based sidelink communication, the precoder indication 235 may indicate to the UE 115-a a value for a precoder parameter. In some implementations, the UE 115-a may determine the precoder parameter (for example, for the non-codebook based sidelink communication).

In some examples, the message 205 may include a DMRS port indication 245. The base station 105-a may use the DMRS port indication 245 to indicate to the UE 115-*a* a value for a DMRS port parameter. For example, the DMRS port indication 245 may include information, such as a table (for example, an RRC table) for DMRS port mappings with code division multiplex (CDM) groups. The CDM groups may indicate whether the sidelink communication is part of a type of scheduling, such as an MU-MIMO or an SU-MIMO type scheduling. With reference to FIG. 2, the base station 105-*a* and the UE 115-*b* in wireless communication with the UE 115-*a* may represent the SU-MIMO type scheduling. Both the UE 115-*a* and the UE 115-*e* in wireless communication with both the UE 115-*b* and the base station 105-*a* may represent the MU-MIMO type scheduling. In some implementations, the UE 115-*a* may determine whether to multiplex a reference signal, such as DMRS, with a channel, such as the PSSCH, based on the CDM groups (whether the sidelink communication is part of the MU-MIMO or the SU-MIMO type scheduling).

In some examples, the message 205 may include an HPN indication 250. The base station 105-*a* may use the HPN indication 250 to indicate to the UE 115-*a* a value for an HPN parameter. For example, the base station 105-*a* may indicate to the UE 115-*a* to use the value for the HPN parameter for the sidelink communication (for example, an SCI-2) such that the HPN parameter for the sidelink communication is the same for the sidelink communication between the UE 115-*a* and the UE 115-*b* as well as the wireless communication between the UE 115-*a* and the base station 105-*a*. By using the same value for the HPN parameter, the base station 105-*a* may track the sidelink communication and feedback associated with the sidelink communication to provide more efficient management of feedback, such as HARQ feedback (for example, retransmissions). In some implementations, the SCI-2 may be absent in the sidelink communication. For these implementations, the UE 115-*a* and the UE 115-*b* may associate the value for the HPN parameter included in the message 205 with the sidelink communication (for example, a sidelink TB) at the MAC layer. In this way, the base station 105-*a* may improve feedback (HARQ) management (for example, scheduling re-transmissions, HARQ buffer flushing, look-like-ratio (LLR) combining at the UE 115-*b*, among others) in the absence of the SCI-2.

In some examples, the message 205 may include a beta offset indication 255. The base station 105-*a* may use the beta offset indication 255 to indicate to the UE 115-*a* a value for a beta offset parameter. For example, the beta offset parameter may be a first beta offset for SCI-2, in which the UE 115-*a* may determine resources for the SCI-2 based on the first beta offset. In some implementations, the beta offset parameter may be a second beta offset. The second beta offset may be used to determine resources for sidelink feedback (HARQ) based on whether the sidelink feedback is multiplexed on a physical uplink shared channel (PUSCH). The base station 105-*a* may dynamically indicate the beta offset parameter by transmitting the message 205 including the beta offset indication 255.

In some examples, the message 205 may include some, all, or any combination of one or more indications. For example, the message 205 may include the feedback indication 210, the PRI, the report of the preference or request of whether the sidelink feedback procedure is enabled, the MCS indication 215, the TB threshold size, the TPC indication 220, the CSI-RS indication 225, the layer indication 230, the precoder indication 235, the codebook indication 240, the DMRS port indication 245, the HPN indication 250, the beta offset indication 255, a cast type, a receiver UE identifier, or any combination thereof.

Figure 3A:
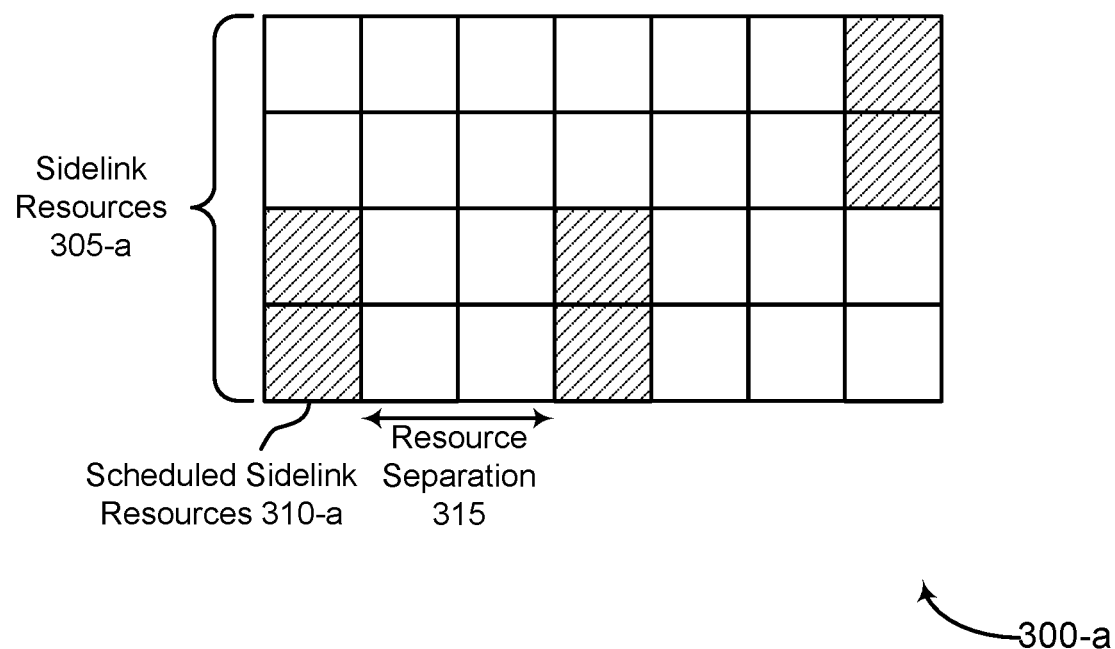
FIGS. 3A and 3B illustrate examples of configurations that support network-controlled sidelink scheduling techniques in accordance with aspects of the present disclosure.
Figure 3B:
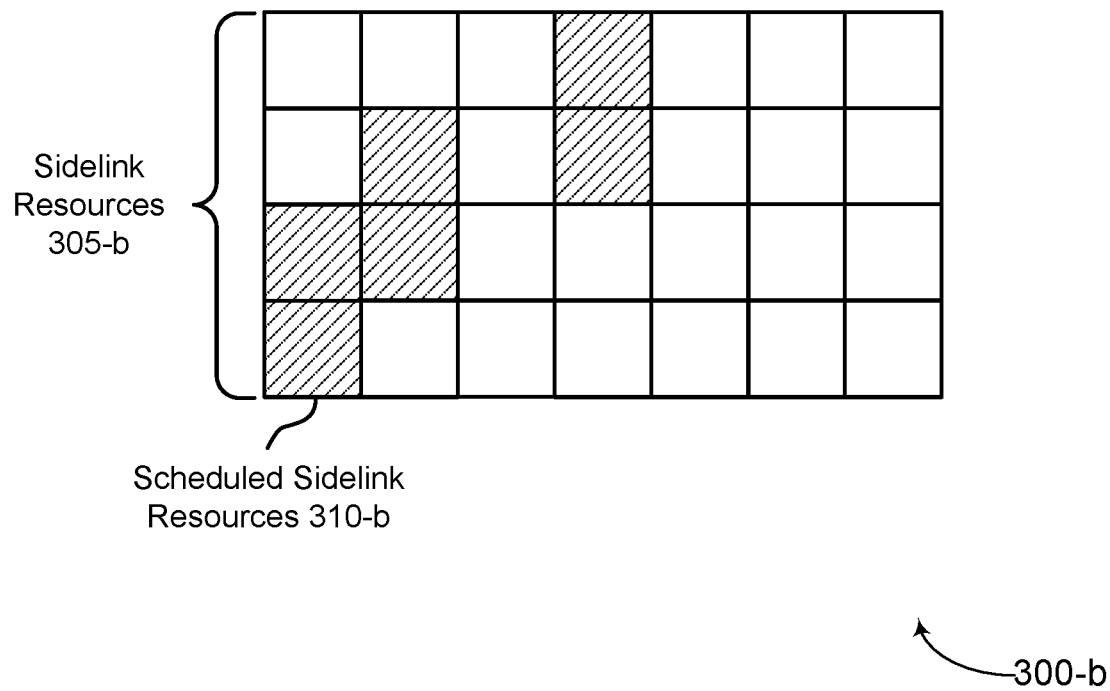

FIGS. 3A and 3B illustrate examples of a configuration 300-*a* and a configuration 300-*b* respectively, that support network-controlled sidelink scheduling techniques in accordance with aspects of the present disclosure. In some examples, the configuration 300-*a* and the configuration 300-*b* may implement or be implemented by aspects of the wireless communications system 100 and the wireless communications system 200, as described with reference to FIGS. 1 and 2. For example, multiple of the configuration 300-*a* and the configuration 300-*b* may be implemented by one or both of a base station 105 or a UE 115 to support network-controlled sidelink scheduling techniques.

A base station 105 may transmit a feedback indication to a UE 115. The feedback indication may be an example of the feedback indication 210 as described with reference to FIG. 2. The feedback indication may indicate, in some examples, whether a sidelink feedback procedure (for example, a sidelink HARQ) is enabled or disabled.

In the example of FIG. 3A, the feedback indication may indicate that the sidelink feedback procedure is enabled, such that the base station 105 may schedule sidelink resources 305-*a* (scheduled sidelink resources 310-*a*), for sidelink communications, with a resource separation 315 between the scheduled sidelink resources 310-*a* and other scheduled sidelink resources. For example, in circumstances in which the sidelink feedback procedure is enabled, there is a feedback round trip time (for example, a HARQ RTT) that a sidelink feedback transmission (associated with a sidelink communication) may take for the sidelink feedback transmission to complete the sidelink feedback procedure. The feedback round trip time (for example, the HARQ RTT) may include time to receive the sidelink feedback transmission, decode the sidelink feedback transmission, determine to transmit or retransmit, and transmit or retransmit the sidelink feedback transmission or the sidelink communication. To compensate for the feedback round trip time (for example, the HARQ RTT), the base station 105 may determine to schedule the sidelink resources 305-*a* with the resource separation 315 greater than the feedback round trip time (for example, the HARQ RTT). In some implementations, the feedback indication may be an implicit indication, in which the UE 115 may determine that the sidelink feedback procedure is enabled based on the resource separation 315 being greater than the feedback round trip time (for example, the HARQ RTT).

In the example of FIG. 3B, the feedback indication may indicate that the sidelink feedback procedure is disabled, such that the base station 105 may schedule sidelink resources 305-*b* (scheduled sidelink resources 310-*b*), for sidelink communications, back-to-back. For example, in circumstances in which the sidelink feedback procedure is disabled, there is a lack of feedback round trip time (for example, the HARQ RTT) because there is a lack of feedback being communicated. Because of the lack of feedback round trip time (for example, the HARQ RTT), the base station 105 may schedule the sidelink resources 305-*b* with a reduced separation (for example, no separation) from other scheduled sidelink resources. In some implementations, the UE 115 (for example, a receiver UE 115) may receive multiple scheduled sidelink communications before completely decoding a previously scheduled sidelink communication. The UE 115 may buffer the multiple scheduled sidelink communications while continuing to decode the previously scheduled sidelink communication.

In some examples, the UE 115 may have a buffer capability. The UE 115 may report the buffer capability (for example, a buffer capability for an LLR or a buffer size) to the base station 105. The base station 105 may schedule sidelink communications with a data rate (for example, a data layer or an MCS) based on the buffer capability of the UE 115. For example, the base station 105 may schedule blind retransmissions with a data rate that does not exceed the buffer capability of the UE 115. In some implementations, the feedback indication may be an implicit indication, in which the UE 115 may determine that the sidelink feedback procedure is disabled based on the reduced separation of scheduled sidelink resources 310-*b* and the other scheduled sidelink resources.

In some examples, the base station 105 may schedule sidelink communications in different RPs with different PSFCH configurations based on whether the sidelink feedback procedure is enabled. In some implementations, the base station 105 scheduling in RPs with PSFCH may enable the sidelink feedback procedure (for example, ensure feedback round trip time constraints are met). The base station 105 scheduling in RPs lacking PSFCH may disable the sidelink feedback procedure (for example, ensure back-to-back scheduling).

Figure 4:
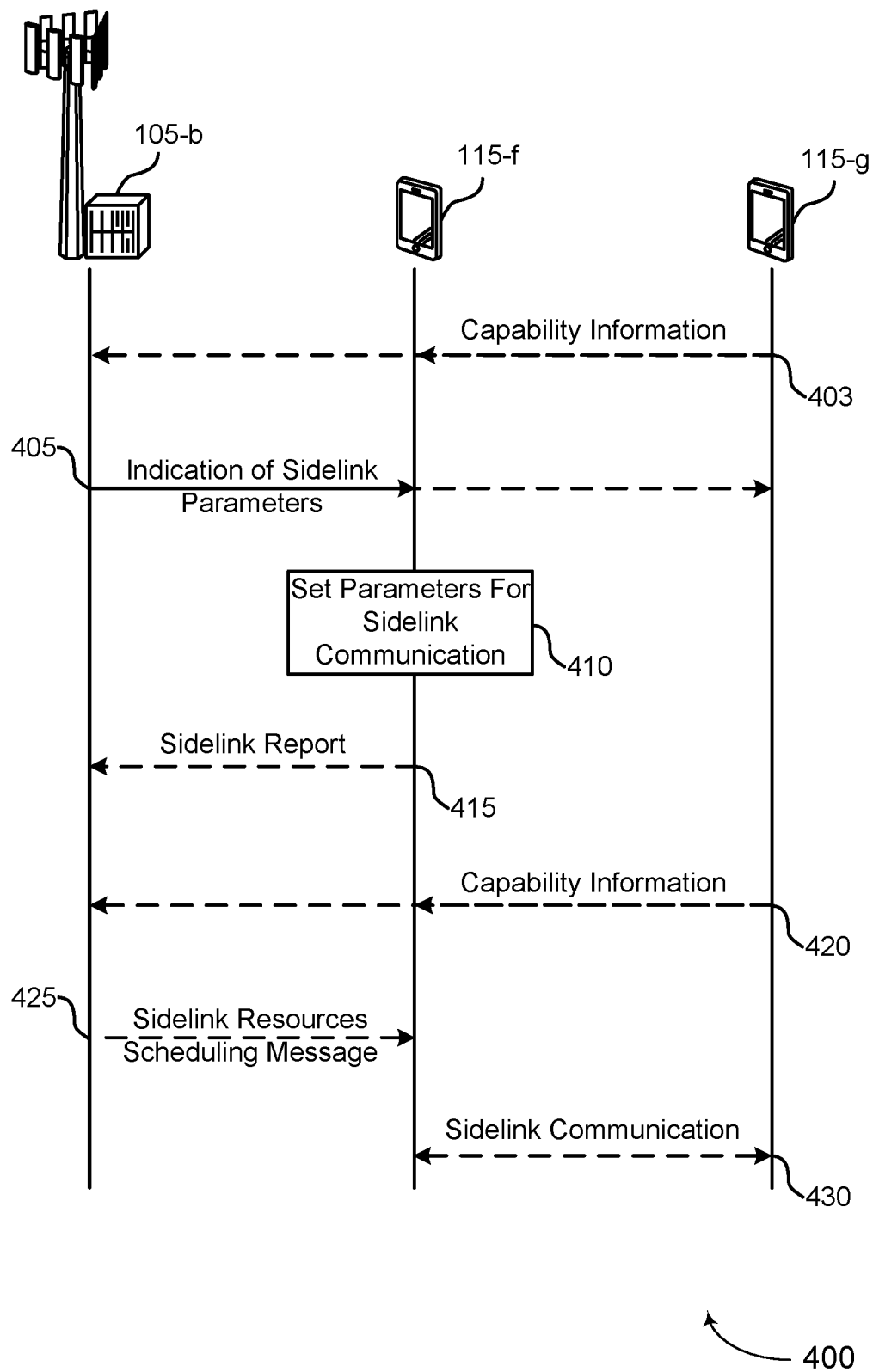
FIG. 4 illustrates an example of a process flow that supports network-controlled sidelink scheduling techniques in accordance with aspects of the present disclosure.

FIG. 4 illustrates an example of a process flow 400 that supports network-controlled sidelink scheduling techniques in accordance with aspects of the present disclosure. The process flow 400 may implement or be implemented by aspects of the wireless communications system 100 or the wireless communications system 200. For example, the process flow 400 may be related to operations performed by a base station 105-*b*, a UE 115-*f*, and a UE 115-*g*, which may be examples of corresponding devices described with reference to FIGS. 1 and 2. In the following description of the process flow 400, some operations may be omitted from the process flow 400, and other operations may be added to the process flow 400.

At 403, at 420, or both, the UE 115-*f*, the UE 115-*g*, or both, may optionally transmit capability information to the base station 105-*b*. In some examples, the UE 115-*g* may transmit the capability information to the UE 115-*f*, such that the UE 115-*f* transmits the capability of the UE 115-*f*, the UE 115-*g*, or both. The capability information may include a buffer capability, as described in more detail with reference to FIG. 3.

At 405, the base station 105-*b* may transmit, to the UE 115-*f*, an indication of a set of sidelink parameters. The set of sidelink parameters may include parameters for a sidelink communication configuration associated with a sidelink communication. The base station 105-*b* may optionally transmit the indication of the set of sidelink parameters to the UE 115-*f*, the UE 115-*g*, or both. By transmitting the set of sidelink parameters to both the UE 115-*f* and the UE 115-*g* the base station may increase efficiency (for example, MU-MIMO type communications) as described with reference to FIGS. 1-3.

In some examples, the indication of the set of sidelink parameters may include: an indication of whether a sidelink feedback procedure is enabled; an indication of an MCS; an indication of multiple TPCs; an indication of how to transmit a sidelink CSI-RS; an indication of a number of layers; an indication of a precoder; an indication of whether the sidelink communication is a codebook sidelink communication or a non-codebook sidelink communication; an indication of multiple reference signal ports; an indication of a feedback process number; an indication of multiple beta offsets; or any combination thereof, as described in more detail with reference to FIG. 2. In some examples, the base station 105-*b* may transmit the indication of the set of sidelink parameters in a DCI message, a MAC-CE message, or an RRC message.

At 410, the UE 115-*f* may set multiple parameters for the sidelink communication based on receiving the indication of the set of parameters for the sidelink communication configuration. Setting a parameter may include configuring an initial value or updating an existing value. For example, as part of an initial setup procedure, the base station 105-*b* may configure the UE 115-*f* by transmitting the indication of the set of sidelink parameters to the UE 115-*f*. The UE 115-*f* may receive the indication of the set of sidelink parameters and set initial values for each parameter indicated by the indication of the set of sidelink parameters. Alternatively, as part of a sidelink communication procedure, the UE 115-*f* may update each parameter indicated by the indication of the set of sidelink parameters. In some examples, the UE 115-*f* may initialize, update, or skip over each parameter indicated.

At 415, the UE 115-*f* may optionally transmit to the base station 105-*b* a sidelink report. In some examples, the indication of the set of sidelink parameters may include the indication of how to transmit a sidelink CSI-RS. The sidelink report may include the sidelink CSI-RS. The UE 115-*f* may transmit the sidelink report aperiodically, semi-persistently, periodically, or any combination thereof, based on the indication of how to transmit the sidelink CSI-RS.

At 425, the base station 105-*b* may optionally transmit to the UE 115-*f* a sidelink resources scheduling message. The base station 105-*b* may specify multiple resources for the UE to use for the sidelink communication, schedule the sidelink communication, or both. In some examples, the sidelink resources scheduling message may be a grant for spatial resources (for example, time and frequency resources). Although depicted in FIG. 4 at 425, this is an illustrative example and not limiting to a specific order of transmission.

At 430, the UE 115-*f* may optionally communicate the sidelink communication with the UE 115-*g* based on setting the multiple parameters for the sidelink communication. Because the base station 105-*b* has more information about the wireless communications system 100 and may be better equipped than the UE 115-*f*, the sidelink communication may be more efficient than a sidelink communication based on parameters for the sidelink communication determined by the UE 115-*f*, as described with reference to FIG. 1. This may support increased spatial reuse of sidelink resources, more efficient sidelink interference management at the base station, and reduced power consumption, among others.

Figure 5:
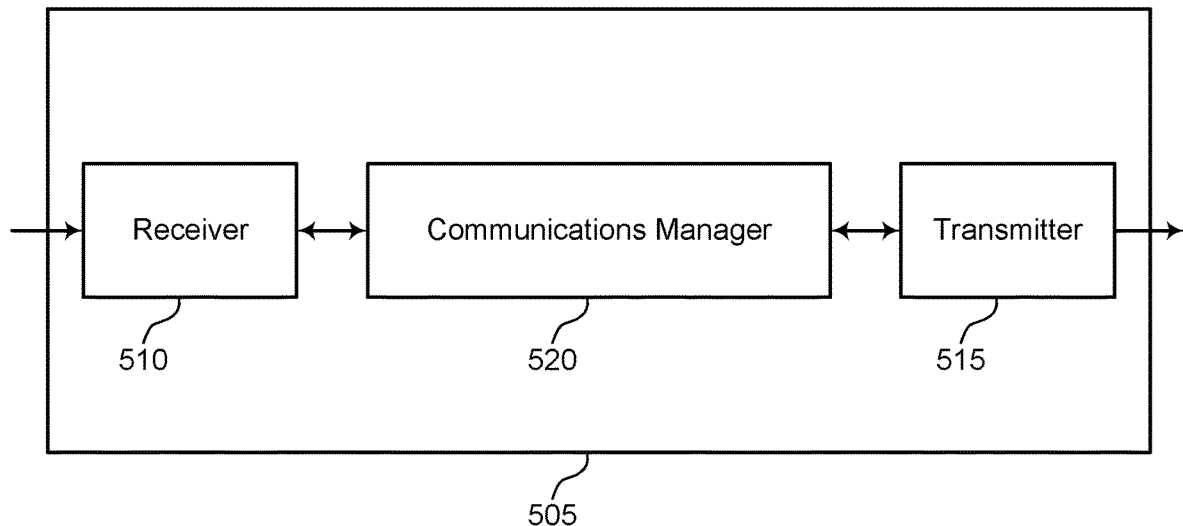
FIGS. 5 and 6 show block diagrams of devices that support network-controlled sidelink scheduling techniques in accordance with aspects of the present disclosure.

FIG. 5 shows a block diagram of a device 505 that supports network-controlled sidelink scheduling techniques in accordance with aspects of the present disclosure. The device 505 may be an example of aspects of a UE 115. The device 505 may include a receiver 510, a transmitter 515, and a communications manager 520. The communications manager 520 can be implemented, at least in part, by one or both of a modem and a processor. Each of these components may be in communication with one another (for example, via multiple buses).

The receiver 510 may provide a means for receiving information such as packets, user data, control information, or any combination thereof associated with various information channels (for example, control channels, data channels, information channels related to network-controlled sidelink scheduling techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to network-controlled sidelink scheduling techniques). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of network-controlled sidelink scheduling techniques. For example, the communications manager 520, the receiver 510, the transmitter 515, or various combinations or components thereof may support a method for performing multiple of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform multiple of the functions described herein (for example, by executing, by the processor, instructions stored in the memory).

Additionally or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 520 may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations.

The communications manager 520 may support wireless communication at a first UE in accordance with examples as disclosed herein. For example, the communications manager 520 may be configured as or otherwise support a means for receiving, from a base station, an indication of a set of parameters for a sidelink communication configuration associated with sidelink communications over a sidelink. The communications manager 520 may be configured as or otherwise support a means for setting multiple parameters for the sidelink communications over the sidelink based on receiving the indication of the set of parameters for the sidelink communication configuration from the base station. The communications manager 520 may be configured as or otherwise support a means for communicating, over the sidelink, with a second UE based on setting the multiple parameters for the sidelink communications over the sidelink.

By including or configuring the communications manager 520, the device 505 (for example, a processor controlling or otherwise coupled to the receiver 510, the transmitter 515, the communications manager 520, or a combination thereof) may support techniques for increased spatial reuse of sidelink resources, more efficient sidelink interference management at the base station, and reduced power consumption.

Figure 6:
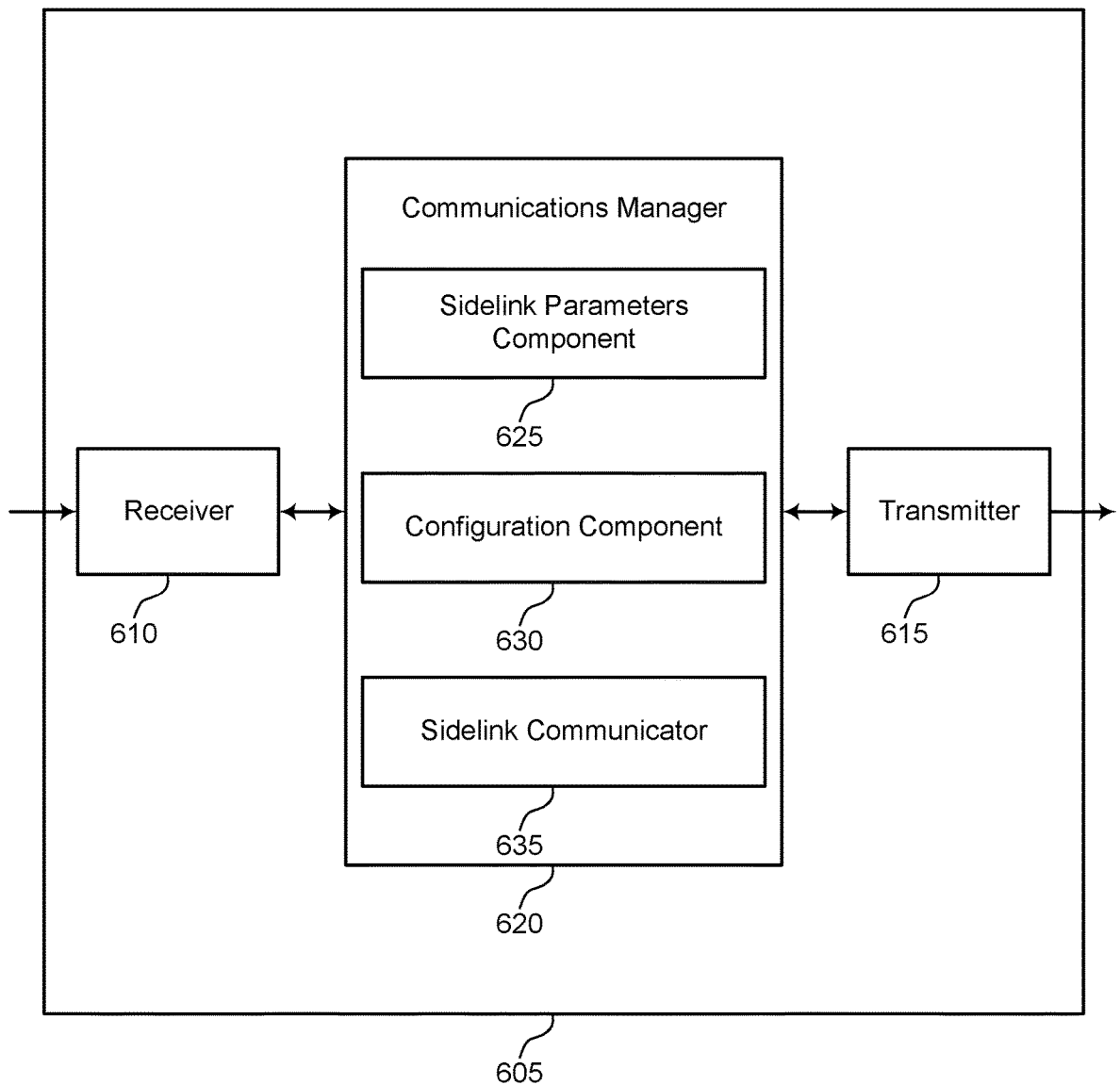

FIG. 6 shows a block diagram of a device 605 that supports network-controlled sidelink scheduling techniques in accordance with aspects of the present disclosure. The device 605 may be an example of aspects of a device 505 or a UE 115. The device 605 may include a receiver 610, a transmitter 615, and a communications manager 620. The communications manager 620 can be implemented, at least in part, by one or both of a modem and a processor. Each of these components may be in communication with one another (for example, via multiple buses).

The receiver 610 may provide a means for receiving information such as packets, user data, control information, or any combination thereof associated with various information channels (for example, control channels, data channels, information channels related to network-controlled sidelink scheduling techniques). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to network-controlled sidelink scheduling techniques). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of network-controlled sidelink scheduling techniques. For example, the communications manager 620 may include a sidelink parameters component 625, a configuration component 630, a sidelink communicator 635, or any combination thereof. In some examples, the communications manager 620, or various components thereof, may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations.

The communications manager 620 may support wireless communication at a first UE in accordance with examples as disclosed herein. The sidelink parameters component 625 may be configured as or otherwise support a means for receiving, from a base station, an indication of a set of parameters for a sidelink communication configuration associated with a sidelink communication. The configuration component 630 may be configured as or otherwise support a means for setting multiple parameters for the sidelink communication based on receiving the indication of the set of parameters for the sidelink communication configuration from the base station. The sidelink communicator 635 may be configured as or otherwise support a means for communicating the sidelink communication with a second UE based on setting the multiple parameters for the sidelink communications over the sidelink based on receiving the indication of the set of parameters for the sidelink communication configuration from the base station. The sidelink communicator 635 may be configured as or otherwise support a means for communicating, over the sidelink, with a second UE based on setting the one or more parameters for the sidelink communications over the sidelink.

Figure 7:
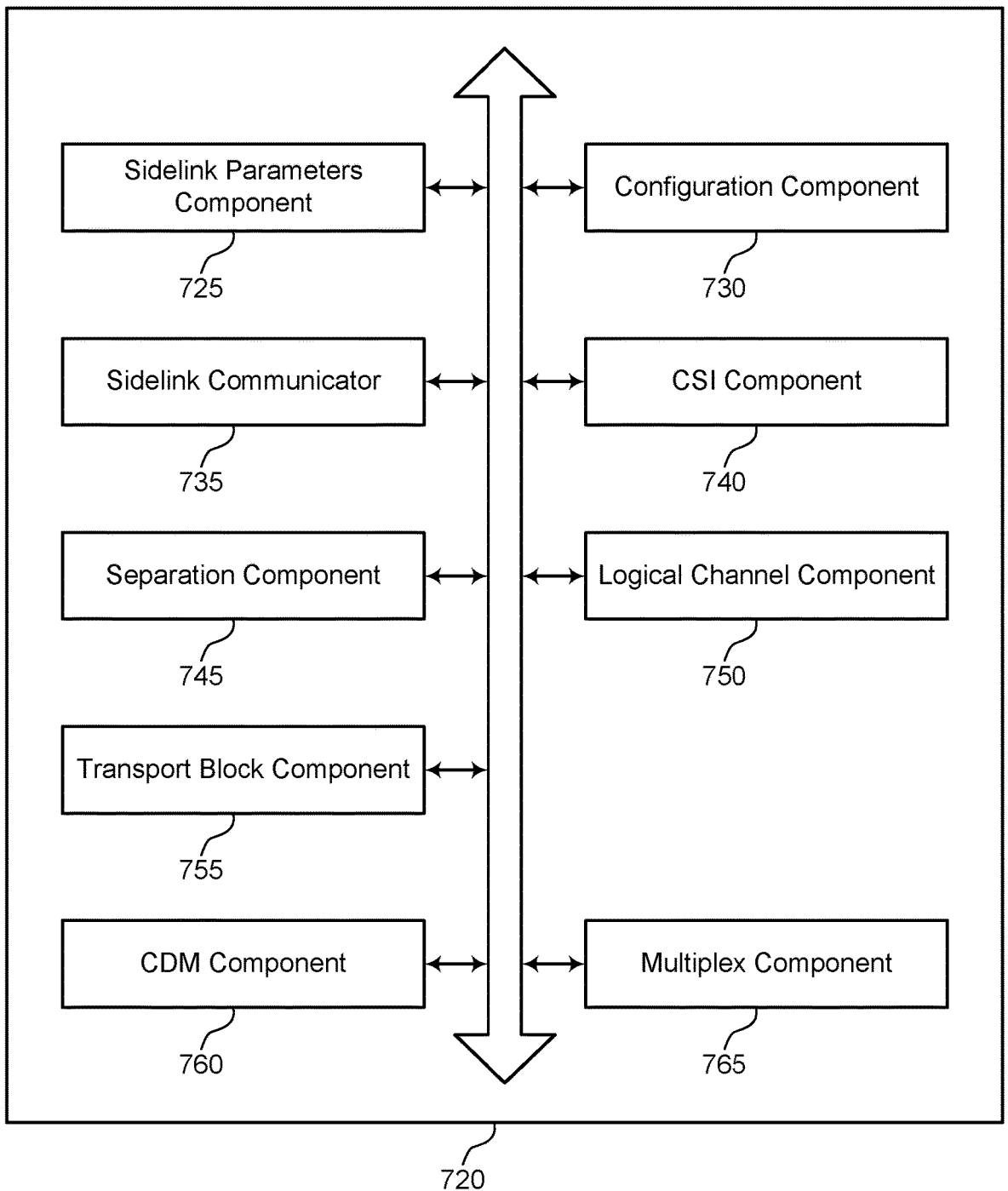
FIG. 7 shows a block diagram of a communications manager that supports network-controlled sidelink scheduling techniques in accordance with aspects of the present disclosure.

FIG. 7 shows a block diagram of a communications manager 720 that supports network-controlled sidelink scheduling techniques in accordance with aspects of the present disclosure. The communications manager 720, or various components thereof, may be an example of means for performing various aspects of network-controlled sidelink scheduling techniques. For example, the communications manager 720 may include a sidelink parameters component 725, a configuration component 730, a sidelink communicator 735, a CSI component 740, a separation component 745, a logical channel component 750, a TB component 755, a CDM component 760, a multiplex component 765, or any combination thereof. Each of these components may communicate, directly or indirectly, with one another (for example, via multiple buses).

The communications manager 720 may support wireless communication at a first UE in accordance with examples as disclosed herein. The sidelink parameters component 725 may be configured as or otherwise support a means for receiving, from a base station, an indication of a set of parameters for a sidelink communication configuration associated with a sidelink communication. The configuration component 730 may be configured as or otherwise support a means for setting multiple parameters for the sidelink communication based on receiving the indication of the set of parameters for the sidelink communication configuration from the base station. The sidelink communicator 735 may be configured as or otherwise support a means for communicating the sidelink communication with a second UE based on setting the multiple parameters for the sidelink communication.

In some examples, the sidelink parameters component 725 may be configured as or otherwise support a means for receiving the indication of the set of parameters for the sidelink communication configuration including receiving DCI including an indication of whether a sidelink feedback procedure is enabled. In some examples, the configuration component 730 may be configured as or otherwise support a means for setting the multiple parameters for the sidelink communications over the sidelink includes setting a sidelink feedback enabled parameter based on the indication of whether the sidelink feedback procedure is enabled.

In some examples, the sidelink feedback procedure includes a sidelink hybrid automatic repeat request.

In some examples, the separation component 745 may be configured as or otherwise support a means for determining a threshold separation in time of sidelink resources based on the indication of whether the sidelink feedback procedure is enabled, in which communicating with the second UE over the sidelink includes receiving the sidelink communications over the sidelink resources based on the threshold separation of the sidelink resources.

In some examples, the threshold separation in time of sidelink resources includes a first threshold separation in time of sidelink resources associated with enabled sidelink feedback and a feedback round trip time, or includes a second threshold separation in time of sidelink resources associated with disabled sidelink feedback. In some examples, the first threshold separation in time is greater than the second threshold separation in time.

In some examples, setting the sidelink feedback enabled parameter is based on the threshold separation in time of sidelink resources.

In some examples, setting the sidelink feedback enabled parameter is based on a PRI, included in the downlink control information, indicating a presence or absence of a physical uplink control channel.

In some examples, the indication of whether the sidelink feedback procedure is enabled is based on an RP index. In some examples, setting the sidelink feedback enabled parameter is further based on the RP index, where the indication of whether the sidelink feedback procedure is enabled includes the RP index.

In some examples, the indication of whether the sidelink feedback procedure is enabled is based on a codepoint. In some examples, setting the sidelink feedback enabled parameter is further based on the codepoint, where the indication of whether the sidelink feedback procedure is enabled includes the codepoint.

In some examples, the indication of whether the sidelink feedback procedure is enabled is based on a scrambling sequence. In some examples, setting the sidelink feedback enabled parameter is further based on the scrambling sequence, where the indication of whether the sidelink feedback procedure is enabled includes the scrambling sequence.

In some examples, the indication of whether the sidelink feedback procedure is enabled is based on a CCE index. In some examples, setting the sidelink feedback enabled parameter is further based on the CCE index, where the indication of whether the sidelink feedback procedure is enabled includes the CCE index.

In some examples, the logical channel component 750 may be configured as or otherwise support a means for transmitting, to the base station an indication of whether multiple logical channels are enabled at the first UE for the sidelink feedback procedure, in which setting the multiple parameters for the sidelink communications over the sidelink is based on whether the multiple logical channels are enabled at the first UE for the sidelink feedback procedure.

In some examples, receiving the indication of the set of parameters for the sidelink communication configuration includes receiving an indication of a MCS for the sidelink communications. In some examples, setting the multiple parameters for the sidelink communications includes setting a MCS parameter based on the indication of the MCS.

In some examples, the indication of the MCS includes one or both of a size of a TB or a number of resource elements.

In some examples, the TB component 755 may be configured as or otherwise support a means for receiving, from the base station, a threshold size of a TB, in which setting the multiple parameters for the sidelink communications is based on the threshold size of the TB.

In some examples, receiving the indication of the set of parameters for the sidelink communication configuration includes receiving an indication of multiple TPCs for the sidelink communications. In some examples, setting the multiple parameters for the sidelink communications includes setting a TPC parameter based on the indication of the multiple TPCs.

In some examples, setting the TPC parameter is further based on whether a PRI is received from the base station.

In some examples, receiving the indication of the set of parameters for the sidelink communication configuration includes receiving a parameter indicating how to transmit a sidelink CSI-RS to the second UE, the method further including transmitting the sidelink CSI-RS to the second UE over the sidelink based on receiving the parameter indicating how to transmit the sidelink CSI-RS to the second UE, the sidelink CSI-RS being transmitted aperiodically, semi-persistently, periodically, or any combination thereof.

In some examples, receiving the indication of the set of parameters for the sidelink communication configuration includes receiving an indication of a number of layers and of a precoder for the sidelink communications. In some examples, setting the multiple parameters for the sidelink communications over the sidelink includes setting a number of layers parameter and a precoder parameter based on the indication of the number of layers and of the precoder.

In some examples, receiving the indication of the set of parameters for the sidelink communication configuration includes receiving an indication of whether the sidelink communications are codebook-based sidelink communications. In some examples, setting the multiple parameters for the sidelink communications over the sidelink includes setting a precoder parameter and a number of layers parameter based on an indication, received from the base station, of multiple parameters associated with the codebook-based sidelink communications, or an indication, received from the base station, of multiple parameters associated with non-codebook-based sidelink communications.

In some examples, receiving the indication of the set of parameters for the sidelink communication configuration includes receiving an indication of multiple reference signal ports for the sidelink communications. In some examples, setting the multiple parameters for the sidelink communications over the sidelink includes setting a reference signal ports parameter based on the indication of the multiple reference signal ports.

In some examples, the CDM component 760 may be configured as or otherwise support a means for determining a CDM group based on the indication of multiple reference signal ports, the CDM group indicating whether a MU MIMO configuration or a single user multiple input multiple output configuration is for the sidelink communications. In some examples, the multiplex component 765 may be configured as or otherwise support a means for determining whether to multiplex a reference signal with a sidelink channel based on the CDM group, in which communicating with the second UE over the sidelink is based on determining whether to multiplex the reference signal with the sidelink channel.

In some examples, receiving the indication of the set of parameters for the sidelink communication configuration includes receiving an indication of a feedback process number. In some examples, setting the multiple parameters for the sidelink communications over the sidelink includes setting a feedback process number parameter based on receiving the indication of the feedback process number. In some examples, communicating with the second UE over the sidelink includes transmitting a sidelink communication based on the feedback process number parameter.

In some examples, receiving the indication of the set of parameters for the sidelink communication configuration includes receiving an indication of multiple beta offsets for the sidelink communications over the sidelink. In some examples, setting the multiple parameters for the sidelink communications over the sidelink includes setting multiple beta offset parameters based on the indication of the multiple beta offsets, in which the multiple beta offset parameters includes a beta offset for the sidelink communication, a beta offset for sidelink feedback, or both.

In some examples, receiving the indication of the set of parameters for the sidelink communication configuration comprises receiving an indication of a redundancy version, a cast type, an identifier for the second UE, or any combination thereof.

In some examples, the base station specifies multiple resources for the UE to use for the sidelink communication and the base station schedules the sidelink communication.

In some examples, the indication of the set of parameters is included in DCI.

Figure 8:
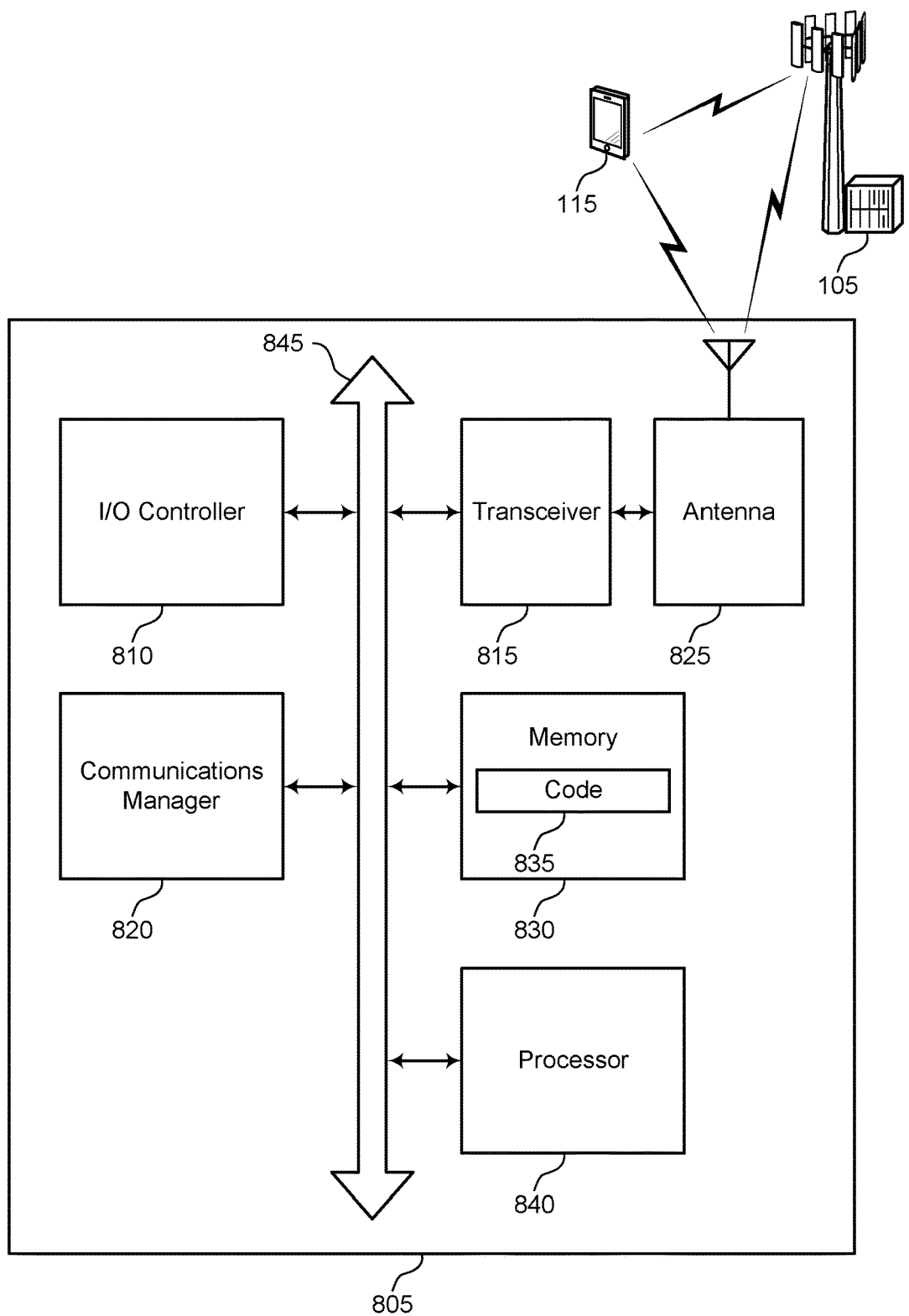
FIG. 8 shows a diagram of a system including a device that supports network-controlled sidelink scheduling techniques in accordance with aspects of the present disclosure.

FIG. 8 shows a diagram of a system including a device 805 that supports network-controlled sidelink scheduling techniques in accordance with aspects of the present disclosure. The device 805 may be an example of or include the components of a device 505, a device 605, or a UE 115. The device 805 may communicate wirelessly with multiple base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via multiple buses (for example, a bus 845).

The I/O controller 810 may manage input and output signals for the device 805. The I/O controller 810 may also manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the multiple antennas 825, wired, or wireless links. For example, the transceiver 815 may represent a wireless transceiver and may communicate bi-directionally with another wireless transceiver. The transceiver 815 may also include a modem to modulate the packets, to provide the modulated packets to multiple antennas 825 for transmission, and to demodulate packets received from the multiple antennas 825. The transceiver 815, or the transceiver 815 and multiple antennas 825, may be an example of a transmitter 515, a transmitter 615, a receiver 510, a receiver 610, or any combination thereof or component thereof.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein. In some examples, the memory 830 may contain, among other things, a basic I/O system (BIOS), which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting network-controlled sidelink scheduling techniques). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a base station, an indication of a set of parameters for a sidelink communication configuration associated with a sidelink communication. The communications manager 820 may be configured as or otherwise support a means for setting multiple parameters for the sidelink communications over the sidelink based on receiving the indication of the set of parameters for the sidelink communication configuration from the base station. The communications manager 820 may be configured as or otherwise support a means for communicating the sidelink communication with a second UE based on setting the multiple parameters for the sidelink communications over the sidelink.

By including or configuring the communications manager 820, the device 805 may support techniques for improved communication reliability, reduced power consumption, more efficient utilization of communication resources, and improved sidelink coordination between devices.

In some examples, the communications manager 820 may be configured to perform various operations (for example, receiving, monitoring, transmitting) using or otherwise in cooperation with the transceiver 815, the multiple antennas 825, or any combination thereof. Although the communications manager 820 is illustrated as a separate component, in some examples, multiple functions described with reference to the communications manager 820 may be supported by or performed by the processor 840, the memory 830, the code 835, or any combination thereof. For example, the code 835 may include instructions executable by the processor 840 to cause the device 805 to perform various aspects of network-controlled sidelink scheduling techniques, or the processor 840 and the memory 830 may be otherwise configured to perform or support such operations.

Figure 9:
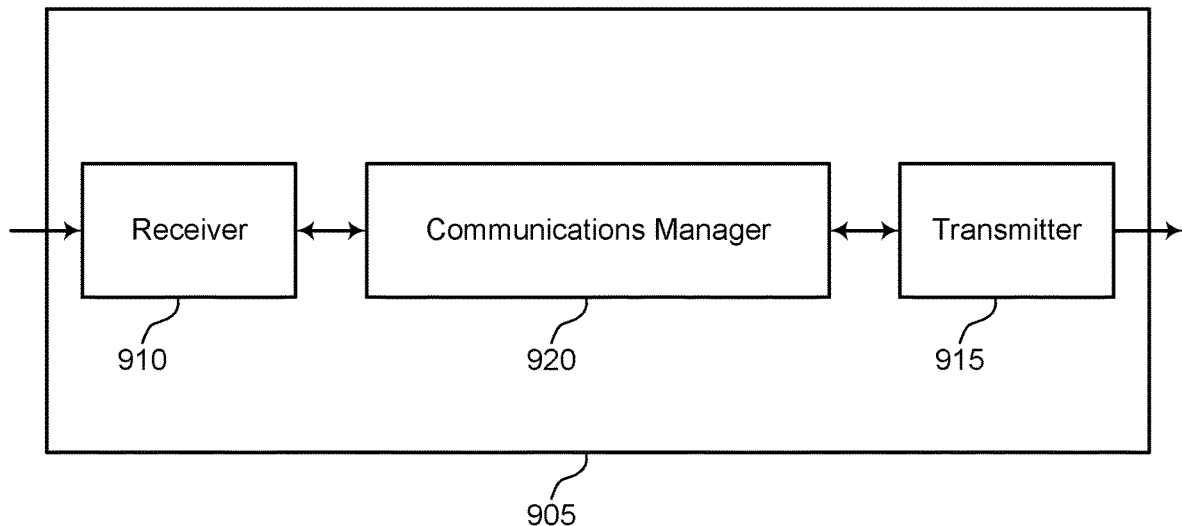
FIGS. 9 and 10 show block diagrams of devices that support network-controlled sidelink scheduling techniques in accordance with aspects of the present disclosure.

FIG. 9 shows a block diagram of a device 905 that supports network-controlled sidelink scheduling techniques in accordance with aspects of the present disclosure. The device 905 may be an example of aspects of a base station 105. The device 905 may include a receiver 910, a transmitter 915, and a communications manager 920. The communications manager 920 can be implemented, at least in part, by one or both of a modem and a processor. Each of these components may be in communication with one another (for example, via multiple buses).

The receiver 910 may provide a means for receiving information such as packets, user data, control information, or any combination thereof associated with various information channels (for example, control channels, data channels, information channels related to network-controlled sidelink scheduling techniques). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to network-controlled sidelink scheduling techniques). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of network-controlled sidelink scheduling techniques. For example, the communications manager 920, the receiver 910, the transmitter 915, or various combinations or components thereof may support a method for performing multiple of the functions described herein.

In some examples, the communications manager 920, the receiver 910, the transmitter 915, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform multiple of the functions described herein (for example, by executing, by the processor, instructions stored in the memory).

Additionally or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations.

The communications manager 920 may support wireless communication at a base station in accordance with examples as disclosed herein. For example, the communications manager 920 may be configured as or otherwise support a means for transmitting, to a first UE, an indication of a set of parameters for a sidelink communication configuration associated with the sidelink communications between the first UE and a second UE over a sidelink. The communications manager 920 may be configured as or otherwise support a means for communicating with the first UE based on transmitting the indication of the set of parameters for the sidelink communication configuration.

By including or configuring the communications manager 920, the device 905 (for example, a processor controlling or otherwise coupled to the receiver 910, the transmitter 915, the communications manager 920, or a combination thereof) may support techniques for increased spatial reuse of sidelink resources, more efficient sidelink interference management, and improved MU-MIMO communications in sidelink for sidelink UEs with different capabilities (for example, number of antennas).

Figure 10:
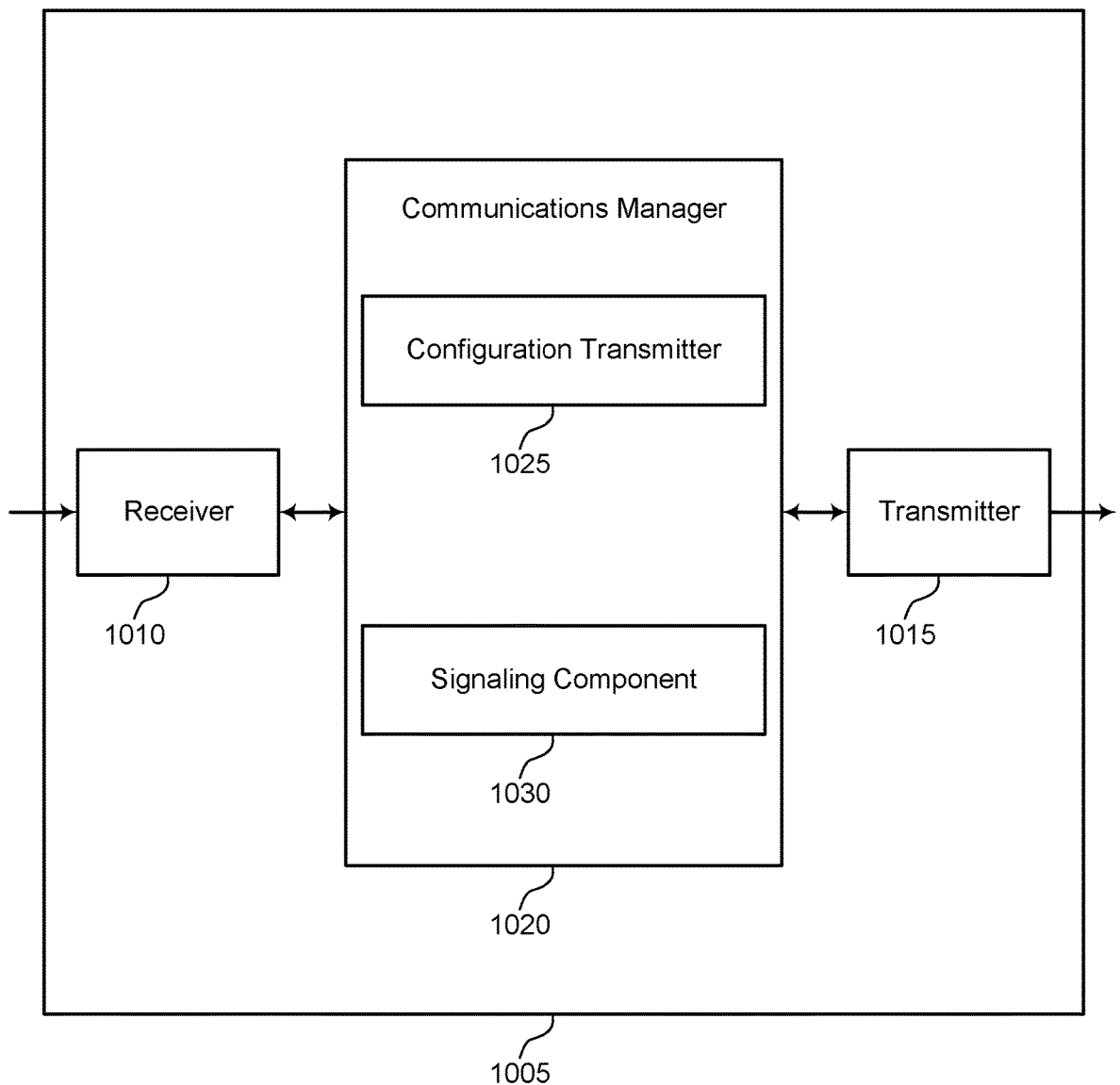

FIG. 10 shows a block diagram of a device 1005 that supports network-controlled sidelink scheduling techniques in accordance with aspects of the present disclosure. The device 1005 may be an example of aspects of a device 905 or a base station 105. The device 1005 may include a receiver 1010, a transmitter 1015, and a communications manager 1020. The communications manager 1020 can be implemented, at least in part, by one or both of a modem and a processor. Each of these components may be in communication with one another (for example, via multiple buses).

The receiver 1010 may provide a means for receiving information such as packets, user data, control information, or any combination thereof associated with various information channels (for example, control channels, data channels, information channels related to network-controlled sidelink scheduling techniques). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to network-controlled sidelink scheduling techniques). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of network-controlled sidelink scheduling techniques. For example, the communications manager 1020 may include a configuration transmitter 1025, a signaling component 1030, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations.

The communications manager 1020 may support wireless communication at a base station in accordance with examples as disclosed herein. The configuration transmitter 1025 may be configured as or otherwise support a means for transmitting, to a first UE, an indication of a set of parameters for a sidelink communication configuration associated with sidelink communications between the first UE and a second UE over a sidelink. The signaling component 1030 may be configured as or otherwise support a means for communicating with the first UE based on transmitting the indication of the set of parameters for the sidelink communication configuration.

Figure 11:
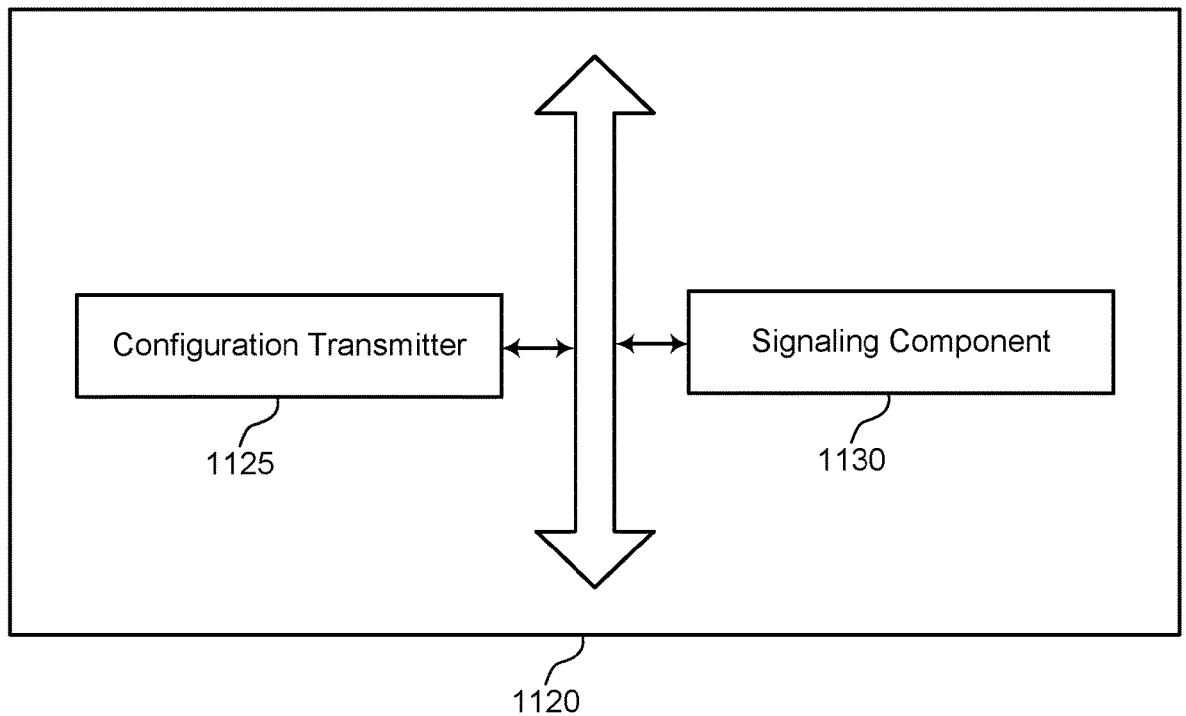
FIG. 11 shows a block diagram of a communications manager that supports network-controlled sidelink scheduling techniques in accordance with aspects of the present disclosure.

FIG. 11 shows a block diagram of a communications manager 1120 that supports network-controlled sidelink scheduling techniques in accordance with aspects of the present disclosure. The communications manager 1120, or various components thereof, may be an example of means for performing various aspects of network-controlled sidelink scheduling techniques. For example, the communications manager 1120 may include a configuration transmitter 1125 and a signaling component 1130, or any combination thereof. Each of these components may communicate, directly or indirectly, with one another (for example, via multiple buses).

The communications manager 1120 may support wireless communication at a base station in accordance with examples as disclosed herein. The configuration transmitter 1125 may be configured as or otherwise support a means for transmitting, to a first UE, an indication of a set of parameters for a sidelink communication configuration associated with sidelink communications between the first UE and a second UE over a sidelink. The signaling component 1130 may be configured as or otherwise support a means for communicating with the first UE based on transmitting the indication of the set of parameters for the sidelink communication configuration.

In some examples, the indication of the set of parameters is included in DCI.

Figure 12:
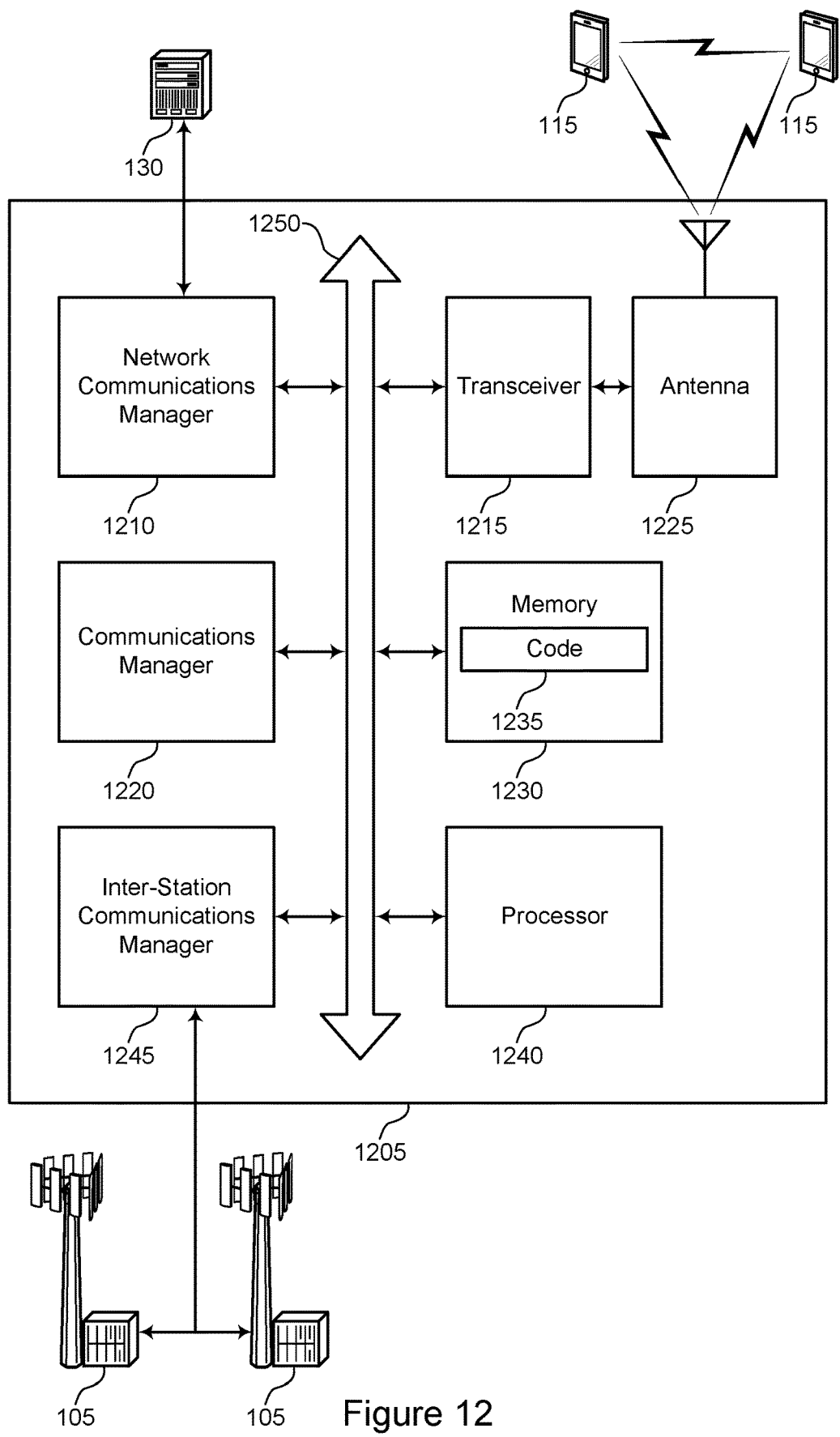
FIG. 12 shows a diagram of a system including a device that supports network-controlled sidelink scheduling techniques in accordance with aspects of the present disclosure.

FIG. 12 shows a diagram of a system including a device 1205 that supports network-controlled sidelink scheduling techniques in accordance with aspects of the present disclosure. The device 1205 may be an example of or include the components of a device 905, a device 1005, or a base station 105. The device 1205 may communicate wirelessly with multiple base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (for example, operatively, communicatively, functionally, electronically, electrically) via multiple buses (for example, a bus 1250).

The network communications manager 1210 may manage communications with a core network 130 (for example, via multiple wired backhaul links). For example, the network communications manager 1210 may manage the transfer of data communications for client devices, such as multiple UEs 115.

In some examples, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the multiple antennas 1225, wired, or wireless links. For example, the transceiver 1215 may represent a wireless transceiver and may communicate bi-directionally with another wireless transceiver. The transceiver 1215 may also include a modem to modulate the packets, to provide the modulated packets to multiple antennas 1225 for transmission, and to demodulate packets received from the multiple antennas 1225. The transceiver 1215, or the transceiver 1215 and multiple antennas 1225, may be an example of a transmitter 915, a transmitter 1015, a receiver 910, a receiver 1010, or any combination thereof or component thereof.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some other cases, a memory controller may be integrated into the processor 1240. The processor 1240 may be configured to execute computer-readable instructions stored in a memory (for example, the memory 1230) to cause the device 1205 to perform various functions (for example, functions or tasks supporting network-controlled sidelink scheduling techniques). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a first UE, an indication of a set of parameters for a sidelink communication configuration associated with sidelink communications between the first UE and a second UE over a sidelink. The communications manager 1220 may be configured as or otherwise support a means for communicating with the first UE based on transmitting the indication of the set of parameters for the sidelink communication configuration.

By including or configuring the communications manager 1220, the device 1205 may support techniques for improved communication reliability, reduced latency, reduced power consumption, more efficient utilization of communication resources, improved coordination between devices.

In some examples, the communications manager 1220 may be configured to perform various operations (for example, receiving, monitoring, transmitting) using or otherwise in cooperation with the transceiver 1215, the multiple antennas 1225, or any combination thereof. Although the communications manager 1220 is illustrated as a separate component, in some examples, multiple functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network-controlled sidelink scheduling techniques, or the processor 1240 and the memory 1230 may be otherwise configured to perform or support such operations.

Figure 13:
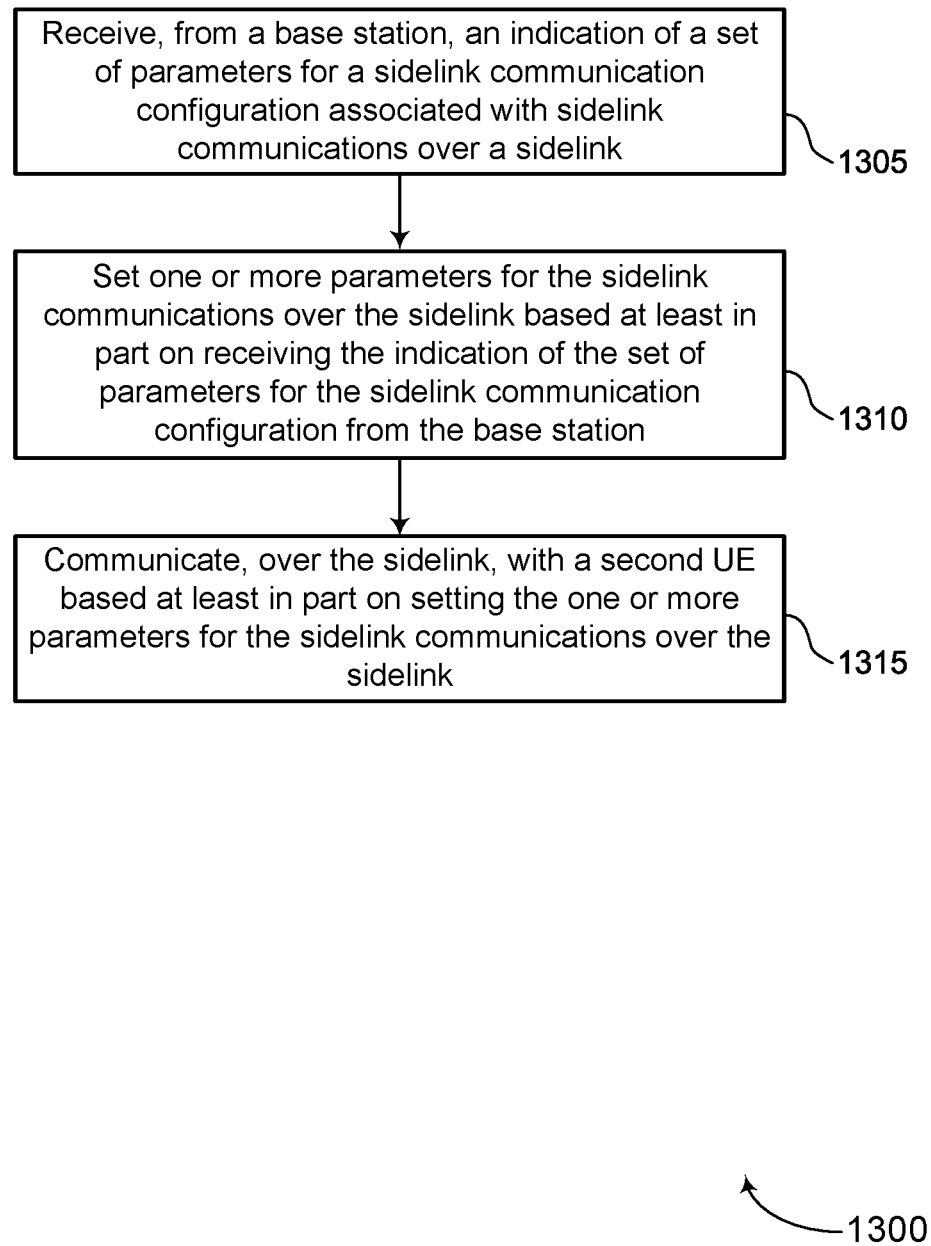
FIGS. 13-15 show flowcharts illustrating methods that support network-controlled sidelink scheduling techniques in accordance with aspects of the present disclosure.

FIG. 13 shows a flowchart illustrating a method 1300 that supports network-controlled sidelink scheduling techniques in accordance with aspects of the present disclosure. The operations of the method 1300 may be implemented by a UE or its components. For example, the operations of the method 1300 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a set of parameters for a sidelink communication configuration associated with sidelink communications over a sidelink. The operations of 1305 may be performed in accordance with examples as disclosed herein. In some examples, aspects of the operations of 1305 may be performed by a sidelink parameters component 725 as described with reference to FIG. 7.

At 1310, the method may include setting multiple parameters for the sidelink communications over the sidelink based on receiving the indication of the set of parameters for the sidelink communication configuration from the base station. The operations of 1310 may be performed in accordance with examples as disclosed herein. In some examples, aspects of the operations of 1310 may be performed by a configuration component 730 as described with reference to FIG. 7.

At 1315, the method may include communicating over the sidelink with a second UE based on setting the multiple parameters for the sidelink communications over the sidelink. The operations of 1315 may be performed in accordance with examples as disclosed herein. In some examples, aspects of the operations of 1315 may be performed by a sidelink communicator 735 as described with reference to FIG. 7.

Figure 14:
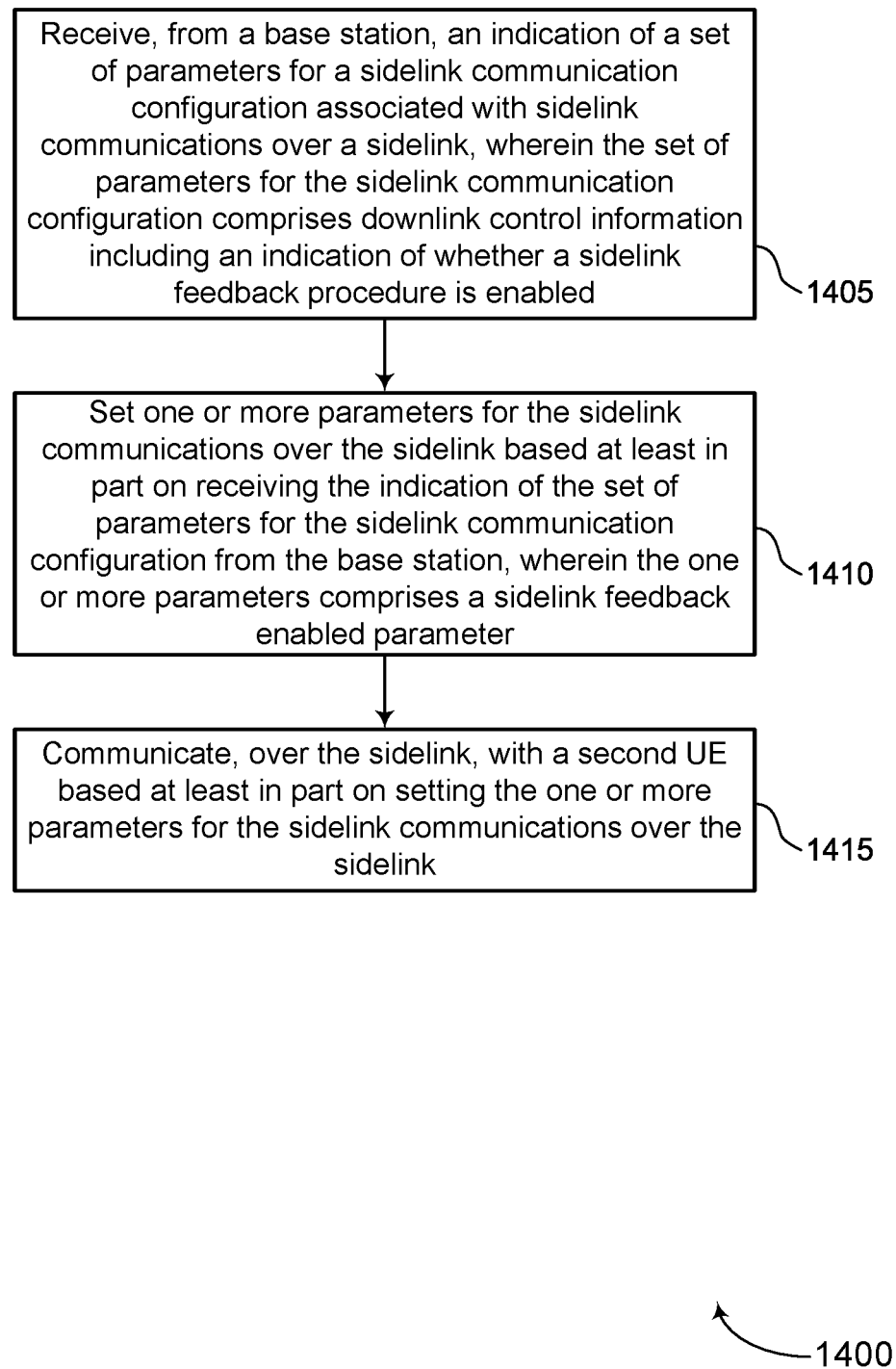

FIG. 14 shows a flowchart illustrating a method 1400 that supports network-controlled sidelink scheduling techniques in accordance with aspects of the present disclosure. The operations of the method 1400 may be implemented by a UE or its components. For example, the operations of the method 1400 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a set of parameters for a sidelink communication configuration associated with sidelink communications over a sidelink, where the set of parameters for the sidelink communication configuration includes an indication of whether a sidelink feedback procedure is enabled. The operations of 1405 may be performed in accordance with examples as disclosed herein. In some examples, aspects of the operations of 1405 may be performed by a sidelink parameters component 725 as described with reference to FIG. 7.

At 1410, the method may include setting multiple parameters for the sidelink communications over the sidelink based on receiving the indication of the set of parameters for the sidelink communication configuration from the base station, in which the multiple parameters includes a sidelink feedback enabled parameter. The operations of 1410 may be performed in accordance with examples as disclosed herein. In some examples, aspects of the operations of 1410 may be performed by a sidelink parameters component 725 as described with reference to FIG. 7.

At 1415, the method may include communicating, over the sidelink, with a second UE based on setting the multiple parameters for the sidelink communications over the sidelink. The operations of 1415 may be performed in accordance with examples as disclosed herein. In some examples, aspects of the operations of 1415 may be performed by a configuration component 730 as described with reference to FIG. 7.

Figure 15:
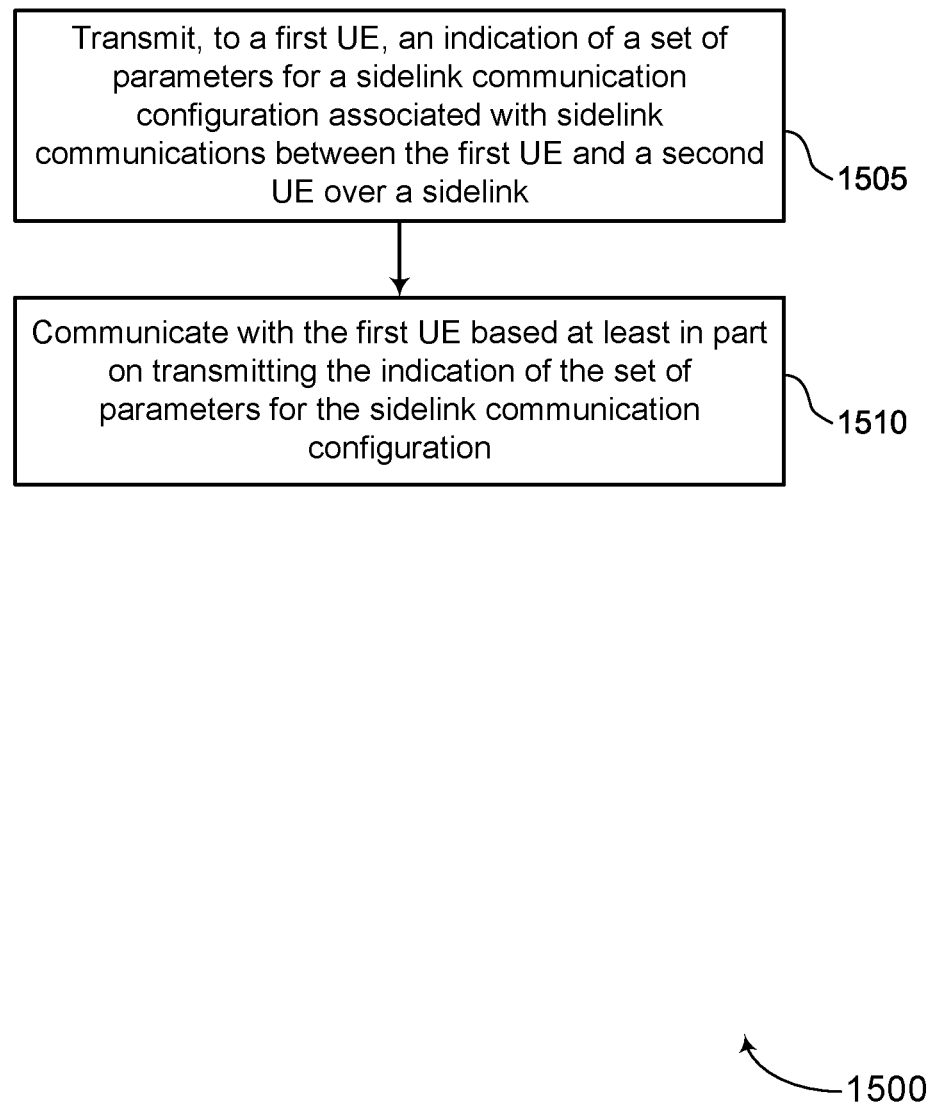

FIG. 15 shows a flowchart illustrating a method 1500 that supports network-controlled sidelink scheduling techniques in accordance with aspects of the present disclosure. The operations of the method 1500 may be implemented by a base station or its components. For example, the operations of the method 1500 may be performed by a base station 105 as described with reference to FIGS. 1-4 and 9-12. In some examples, a base station may execute a set of instructions to control the functional elements of the base station to perform the described functions. Additionally or alternatively, the base station may perform aspects of the described functions using special-purpose hardware.

At 1505, the method may include transmitting, to a first UE, an indication of a set of parameters for a sidelink communication configuration associated with sidelink communications between the first UE and a second UE over a sidelink. The operations of 1505 may be performed in accordance with examples as disclosed herein. In some examples, aspects of the operations of 1505 may be performed by a configuration transmitter 1125 as described with reference to FIG. 11.

At 1510, the method may include communicating with the first UE based on transmitting the indication of the set of parameters for the sidelink communication configuration. The operations of 1510 may be performed in accordance with examples as disclosed herein. In some examples, aspects of the operations of 1510 may be performed by a signaling component 1130 as described with reference to FIG. 11.

The following provides an overview of aspects of the present disclosure:

Aspect 1: A method for wireless communication at a first UE, comprising: receiving, from a base station, an indication of a set of parameters for a sidelink communication configuration associated with sidelink communications over a sidelink; setting one or more parameters for the sidelink communications over the sidelink based at least in part on receiving the indication of the set of parameters for the sidelink communication configuration from the base station; and communicating, over the sidelink, with a second UE based at least in part on setting the one or more parameters for the sidelink communications over the sidelink.

Aspect 2: The method of aspect 1, wherein receiving the indication of the set of parameters for the sidelink communication configuration comprises receiving downlink control information including an indication of whether a sidelink feedback procedure is enabled; and setting the one or more parameters for the sidelink communications over the sidelink comprises setting a sidelink feedback enabled parameter based at least in part on the indication of whether the sidelink feedback procedure is enabled.

Aspect 3: The method of aspect 2, wherein the sidelink feedback procedure comprises a sidelink hybrid automatic repeat request.

Aspect 4: The method of any of aspects 2 through 3, further comprising: determining a threshold separation in time of sidelink resources based at least in part on the indication of whether the sidelink feedback procedure is enabled, wherein communicating with the second UE over the sidelink comprises: receiving the sidelink communications over the sidelink resources based at least in part on the threshold separation of the sidelink resources.

Aspect 5: The method of aspect 4, wherein the threshold separation of sidelink resources in time comprises a first threshold separation in time of sidelink resources associated with enabled sidelink feedback and a feedback round trip time, or comprises a second threshold separation in time of sidelink resources associated with disabled sidelink feedback, the first threshold separation in time is greater than the second threshold separation in time.

Aspect 6: The method of any of aspects 4 through 5, wherein setting the sidelink feedback enabled parameter is based at least in part on the threshold separation in time of sidelink resources.

Aspect 7: The method of any of aspects 2 through 6, wherein setting the sidelink feedback enabled parameter is based at least in part on a physical uplink control channel resource indicator, included in the downlink control information, indicating a presence or absence of a physical uplink control channel.

Aspect 8: The method of any of aspects 2 through 7, wherein the indication of whether the sidelink feedback procedure is enabled is based at least in part on a resource pool index indicating whether the sidelink feedback procedure is enabled; and setting the sidelink feedback enabled parameter is further based at least in part on the resource pool index, wherein the indication of whether the sidelink feedback procedure is enabled comprises the resource pool index.

Aspect 9: The method of any of aspects 2 through 8, wherein the indication of whether the sidelink feedback procedure is enabled is based at least in part on a codepoint; and setting the sidelink feedback enabled parameter is further based at least in part on the codepoint, wherein the indication of whether the sidelink feedback procedure is enabled comprises the codepoint.

Aspect 10: The method of any of aspects 2 through 9, wherein the indication of whether the sidelink feedback procedure is enabled is based at least in part on a scrambling sequence; and setting the sidelink feedback enabled parameter is further based at least in part on the scrambling sequence, wherein the indication of whether the sidelink feedback procedure is enabled comprises the scrambling sequence.

Aspect 11: The method of any of aspects 2 through 10, wherein the indication of whether the sidelink feedback procedure is enabled is based at least in part on a control channel element index; and setting the sidelink feedback enabled parameter is further based at least in part on the control channel element index, wherein the indication of whether the sidelink feedback procedure is enabled comprises the control channel element index.

Aspect 12: The method of any of aspects 2 through 11, further comprising transmitting, to the base station, an indication of whether one or more logical channels are enabled at the first UE for the sidelink feedback procedure, wherein setting the one or more parameters for the sidelink communications over the sidelink is based at least in part on whether the one or more logical channels are enabled at the first UE for the sidelink feedback procedure Aspect 13: The method of any of aspects 1 through 12, further comprising: receiving the indication of the set of parameters for the sidelink communication configuration comprises receiving an indication of a modulation and coding scheme for the sidelink communications; and setting the one or more parameters for the sidelink communications comprises setting a modulation and coding scheme parameter based at least in part on the indication of the modulation and coding scheme.

Aspect 14: The method of aspect 13, wherein the indication of the modulation and coding scheme comprises one or both of a size of a transport block or a number of resource elements.

Aspect 15: The method of any of aspects 13 through 14, further comprising: receiving, from the base station, a threshold size of a transport block, wherein setting the one or more parameters for the sidelink communications is based at least in part on the threshold size of the transport block.

Aspect 16: The method of any of aspects 1 through 15, wherein receiving the indication of the set of parameters for the sidelink communication configuration comprises receiving an indication of one or more transmit power controls for the sidelink communications; and setting the one or more parameters for the sidelink communications comprises setting a transmit power control parameter based at least in part on the indication of the one or more transmit power controls.

Aspect 17: The method of aspect 16, wherein setting the transmit power control parameter is further based at least in part on whether a physical uplink control channel resource indicator is received from the base station.

Aspect 18: The method of any of aspects 1 through 17, wherein receiving the indication of the set of parameters for the sidelink communication configuration comprises receiving a parameter indicating how to transmit a sidelink channel state information reference signal to the second UE, the method further comprising: transmitting the sidelink channel state information reference signal to the second UE over the sidelink based at least in part on receiving the parameter indicating how to transmit the sidelink channel state information reference signal to the second UE, the sidelink channel state information reference signal being transmitted aperiodically, semi-persistently, periodically, or any combination thereof.

Aspect 19: The method of any of aspects 1 through 18, wherein receiving the indication of the set of parameters for the sidelink communication configuration comprises receiving an indication of a number of layers and of a precoder for the sidelink communications; and setting the one or more parameters for the sidelink communications over the sidelink comprises setting a number of layers parameter and a precoder parameter based at least in part on the indication of the number of layers and of the precoder.

Aspect 20: The method of any of aspects 1 through 19, further comprising: receiving the indication of the set of parameters for the sidelink communication configuration comprises receiving an indication of whether the sidelink communications are codebook-based sidelink communications; and setting the one or more parameters for the sidelink communications over the sidelink comprises setting a precoder parameter and a number of layers parameter based at least in part on an indication, received from the base station, of one or more parameters associated with the codebook-based sidelink communications, or an indication, received from the base station, of one or more parameters associated with non-codebook-based sidelink communications.

Aspect 21: The method of any of aspects 1 through 20, wherein receiving the indication of the set of parameters for the sidelink communication configuration comprises receiving an indication of one or more reference signal ports for the sidelink communications; and setting the one or more parameters for the sidelink communications over the sidelink comprises setting a reference signal ports parameter based at least in part on the indication of the one or more reference signal ports.

Aspect 22: The method of aspect 21, further comprising: determining a code division multiplexing group based at least in part on the indication of one or more reference signal ports, the code division multiplexing group indicating whether a multiple user multiple input multiple output configuration or a single user multiple input multiple output configuration is for the sidelink communications; and determining whether to multiplex a reference signal with a sidelink channel based at least in part on the code division multiplexing group, wherein communicating with the second UE over the sidelink is based at least in part on determining whether to multiplex the reference signal with the sidelink channel.

Aspect 23: The method of any of aspects 1 through 22, wherein receiving the indication of the set of parameters for the sidelink communication configuration comprises receiving an indication of a feedback process number; setting the one or more parameters for the sidelink communications over the sidelink comprises setting a feedback process number parameter based at least in part on receiving the indication of the feedback process number; and communicating with the second UE over the sidelink comprises transmitting a sidelink communication based at least in part on the feedback process number parameter.

Aspect 24: The method of any of aspects 1 through 23, wherein receiving the indication of the set of parameters for the sidelink communication configuration comprises receiving an indication of one or more beta offsets for the sidelink communications over the sidelink; and setting the one or more parameters for the sidelink communications over the sidelink comprises setting one or more beta offset parameters based at least in part on the indication of the one or more beta offsets, wherein the one or more beta offset parameters comprises a beta offset for the sidelink communication, a beta offset for sidelink feedback, or both.

Aspect 25: The method of any of aspects 1 through 24, wherein receiving the indication of the set of parameters for the sidelink communication configuration comprises receiving an indication of a redundancy version, a cast type, an identifier for the second UE, or any combination thereof.

Aspect 26: A method for wireless communication at a base station, comprising: transmitting, to a first UE, an indication of a set of parameters for a sidelink communication configuration associated with sidelink communications between the first UE and a second UE over a sidelink; and communicating with the first UE based at least in part on transmitting the indication of the set of parameters for the sidelink communication configuration.

Aspect 27: The method of aspect 26, wherein the indication of the set of parameters is included in downlink control information.

Aspect 28: An apparatus for wireless communication at a first UE, comprising a processor; memory coupled with the processor; and instructions stored in the memory and executable by the processor to cause the apparatus to perform a method of any of aspects 1 through 25.

Aspect 29: An apparatus for wireless communication at a first UE, comprising at least one means for performing a method of any of aspects 1 through 25.

Aspect 30: A non-transitory computer-readable medium storing code for wireless communication at a first UE, the code comprising instructions executable by a processor to perform a method of any of aspects 1 through 25.

Aspect 31: An apparatus for wireless communication at a base station, comprising a processor; memory coupled with the processor; and instructions stored in the memory and executable by the processor to cause the apparatus to perform a method of any of aspects 26 through 27.

Aspect 32: An apparatus for wireless communication at a base station, comprising at least one means for performing a method of any of aspects 26 through 27.

Aspect 33: A non-transitory computer-readable medium storing code for wireless communication at a base station, the code comprising instructions executable by a processor to perform a method of any of aspects 26 through 27.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, multiple microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as multiple instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "multiple of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Additionally, "set" as used as a group of objects (for example, a set of parameters), indicates a group of one or more (for example, one or more) objects, such as one or more parameters.

The term "determine" or "determining" encompasses a wide variety of actions and, "determining" can include calculating, computing, processing, deriving, investigating, looking up (such as via looking up in a table, a database or another data structure), and ascertaining. Also, "determining" can include receiving (such as receiving information) and accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a base station, an indication of a set of parameters for a sidelink communication configuration associated with sidelink communications over a sidelink, the set of parameters configured to cause setting of one or more parameters for the sidelink communications;
   setting the one or more parameters for the sidelink communications over the sidelink based at least in part on receiving the indication of the set of parameters for the sidelink communication configuration from the base station, the one or more parameters comprising a sidelink feedback enabled parameter; and
   communicating, over the sidelink, with a second UE based at least in part on setting the one or more parameters for the sidelink communications over the sidelink.

2. The method of claim 1, wherein:
   receiving the indication of the set of parameters for the sidelink communication configuration comprises receiving downlink control information including an indication of whether a sidelink feedback procedure is enabled; and
   setting the one or more parameters for the sidelink communications over the sidelink comprises setting the sidelink feedback enabled parameter based at least in part on the indication of whether the sidelink feedback procedure is enabled.

3. The method of claim 2, wherein the sidelink feedback procedure comprises a sidelink hybrid automatic repeat request.

4. The method of claim 2, further comprising:
   determining a threshold separation in time of sidelink resources based at least in part on the indication of whether the sidelink feedback procedure is enabled, wherein communicating with the second UE over the sidelink comprises:
   receiving the sidelink communications over the sidelink resources based at least in part on the threshold separation of the sidelink resources.

5. The method of claim 4, wherein the threshold separation in time of sidelink resources comprises a first threshold separation in time of sidelink resources associated with enabled sidelink feedback and a feedback round trip time, or comprises a second threshold separation in time of sidelink resources associated with disabled sidelink feedback, wherein the first threshold separation in time is greater than the second threshold separation in time.

6. The method of claim 4, wherein setting the sidelink feedback enabled parameter is based at least in part on the threshold separation in time of sidelink resources.

7. The method of claim 2, wherein setting the sidelink feedback enabled parameter is based at least in part on a physical uplink control channel resource indicator, included in the downlink control information, indicating a presence or absence of a physical uplink control channel.

8. The method of claim 2, wherein:
the indication of whether the sidelink feedback procedure is enabled comprises a resource pool index; and
setting the sidelink feedback enabled parameter is based at least in part on the resource pool index.

9. The method of claim 2, wherein:
the indication of whether the sidelink feedback procedure is enabled comprises a codepoint; and
setting the sidelink feedback enabled parameter is based at least in part on the codepoint.

10. The method of claim 2, wherein:
the indication of whether the sidelink feedback procedure is enabled comprises a scrambling sequence; and
setting the sidelink feedback enabled parameter is based at least in part on the scrambling sequence.

11. The method of claim 2, wherein:
the indication of whether the sidelink feedback procedure is enabled comprises a control channel element index; and
setting the sidelink feedback enabled parameter is based at least in part on the control channel element index.

12. The method of claim 2, further comprising transmitting, to the base station, an indication of whether one or more logical channels are enabled at the first UE for the sidelink feedback procedure, wherein setting the one or more parameters for the sidelink communications over the sidelink is based at least in part on whether the one or more logical channels are enabled at the first UE for the sidelink feedback procedure.

13. The method of claim 1, wherein:
receiving the indication of the set of parameters for the sidelink communication configuration comprises receiving an indication of a modulation and coding scheme for the sidelink communications; and
setting the one or more parameters for the sidelink communications comprises setting a modulation and coding scheme parameter based at least in part on the indication of the modulation and coding scheme.

14. The method of claim 13, wherein the indication of the modulation and coding scheme comprises one or both of a size of a transport block or a number of resource elements.

15. The method of claim 13, further comprising receiving, from the base station, a threshold size of a transport block, wherein setting the one or more parameters for the sidelink communications is based at least in part on the threshold size of the transport block.

16. The method of claim 1, wherein:
receiving the indication of the set of parameters for the sidelink communication configuration comprises receiving an indication of one or more transmit power controls for the sidelink communications; and
setting the one or more parameters for the sidelink communications comprises setting a transmit power control parameter based at least in part on the indication of the one or more transmit power controls.

17. The method of claim 16, wherein setting the transmit power control parameter is further based at least in part on whether a physical uplink control channel resource indicator is received from the base station.

18. The method of claim 1, wherein:
receiving the indication of the set of parameters for the sidelink communication configuration comprises receiving a parameter indicating how to transmit a sidelink channel state information reference signal to the second UE, the method further comprising:
transmitting the sidelink channel state information reference signal to the second UE over the sidelink based at least in part on receiving the parameter indicating how to transmit the sidelink channel state information reference signal to the second UE, the sidelink channel state information reference signal being transmitted aperiodically, semi-persistently, periodically, or any combination thereof.

19. The method of claim 1, wherein:
receiving the indication of the set of parameters for the sidelink communication configuration comprises receiving an indication of a number of layers and of a precoder for the sidelink communications; and
setting the one or more parameters for the sidelink communications over the sidelink comprises setting a number of layers parameter and a precoder parameter based at least in part on the indication of the number of layers and of the precoder.

20. The method of claim 1, wherein:
receiving the indication of the set of parameters for the sidelink communication configuration comprises receiving an indication of whether the sidelink communications are codebook-based sidelink communications; and
setting the one or more parameters for the sidelink communications over the sidelink comprises setting a precoder parameter and a number of layers parameter based at least in part on an indication, received from the base station, of one or more parameters associated with the codebook-based sidelink communications, or an indication, received from the base station, of one or more parameters associated with non-codebook-based sidelink communications.

21. The method of claim 1, wherein:
receiving the indication of the set of parameters for the sidelink communication configuration comprises receiving an indication of one or more reference signal ports for the sidelink communications; and
setting the one or more parameters for the sidelink communications over the sidelink comprises setting a reference signal ports parameter based at least in part on the indication of the one or more reference signal ports.

22. The method of claim 21, further comprising:
determining a code division multiplexing group based at least in part on the indication of the one or more reference signal ports, the code division multiplexing group indicating whether a multiple user multiple input multiple output configuration or a single user multiple input multiple output configuration is for the sidelink communications; and
determining whether to multiplex a reference signal with a sidelink channel based at least in part on the code division multiplexing group, wherein communicating with the second UE over the sidelink is based at least in part on determining whether to multiplex the reference signal with the sidelink channel.

23. The method of claim 1, wherein:
receiving the indication of the set of parameters for the sidelink communication configuration comprises receiving an indication of a feedback process number;
setting the one or more parameters for the sidelink communications over the sidelink comprises setting a feedback process number parameter based at least in part on receiving the indication of the feedback process number; and
communicating with the second UE over the sidelink comprises transmitting a sidelink communication based at least in part on the feedback process number parameter.

24. The method of claim 1, wherein:
  receiving the indication of the set of parameters for the sidelink communication configuration comprises receiving an indication of one or more beta offsets for the sidelink communications over the sidelink; and
  setting the one or more parameters for the sidelink communications over the sidelink comprises setting one or more beta offset parameters based at least in part on the indication of the one or more beta offsets, wherein the one or more beta offset parameters comprise a beta offset for the sidelink communications, a beta offset for sidelink feedback, or both.

25. The method of claim 1, wherein receiving the indication of the set of parameters for the sidelink communication configuration comprises receiving an indication of a redundancy version, a cast type, an identifier for the second UE, or any combination thereof.

26. A method for wireless communication at a base station, comprising:
  transmitting, to a first user equipment (UE), an indication of a set of parameters for a sidelink communication configuration associated with sidelink communications between the first UE and a second UE over a sidelink, wherein the set of parameters is configured to cause setting of one or more parameters for the sidelink communications, the one or more parameters comprising a feedback enabled parameter; and
  communicating with the first UE based at least in part on transmitting the indication of the set of parameters for the sidelink communication configuration.

27. The method of claim 26, wherein the indication of the set of parameters is included in downlink control information.

28. An apparatus for wireless communication at a first user equipment (UE), comprising:
  a processor; and
  memory coupled with the processor and storing instructions executable by the processor to cause the apparatus to:
    receive, from a base station, an indication of a set of parameters for a sidelink communication configuration associated with sidelink communications over a sidelink, the set of parameters configured to cause setting of one or more parameters for the sidelink communications;
    set the one or more parameters for the sidelink communications over the sidelink based at least in part on receiving the indication of the set of parameters for the sidelink communication configuration from the base station, the one or more parameters comprising a sidelink feedback enabled parameter; and
    communicate, over the sidelink, with a second UE based at least in part on setting the one or more parameters for the sidelink communications over the sidelink.

29. An apparatus for wireless communication at a base station, comprising:
  a processor; and
  memory coupled with the processor and storing instructions executable by the processor to cause the apparatus to:
    transmit, to a first user equipment (UE), an indication of a set of parameters for a sidelink communication configuration associated with sidelink communications between the first UE and a second UE over a sidelink, wherein the set of parameters is configured to cause setting of one or more parameters for the sidelink communications, the one or more parameters comprising a feedback enabled parameter; and
    communicate with the first UE based at least in part on transmitting the indication of the set of parameters for the sidelink communication configuration.

* * * * *